US012203222B2

(12) United States Patent
McKee et al.

(10) Patent No.: US 12,203,222 B2
(45) **Date of Patent: *Jan. 21, 2025**

(54) TOILET TISSUE COMPRISING A DYNAMIC SURFACE

(71) Applicant: The Procter & Gamble Company, Cincinnati, OH (US)

(72) Inventors: Matthew Gary McKee, Cincinnati, OH (US); Brooke Marie Woods, Springfield Township, OH (US); Joerg Kleinwaechter, Loveland, OH (US); Atiya Jordan-Brown, Lebanon, OH (US); David Warren Loebker, Cincinnati, OH (US); Jeffrey Glen Sheehan, Symmes Township, OH (US); Paul Dennis Trokhan, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,066

(22) Filed: Feb. 6, 2023

(65) Prior Publication Data

US 2023/0188375 A1 Jun. 15, 2023

Related U.S. Application Data

(63) Continuation of application No. 17/082,263, filed on Oct. 28, 2020, now Pat. No. 11,591,752.

(Continued)

(51) Int. Cl.

*D21H 27/30* (2006.01)
*A47K 10/16* (2006.01)

(Continued)

(52) U.S. Cl.

CPC ............ *D21H 27/30* (2013.01); *A47K 10/16* (2013.01); *B31F 1/07* (2013.01); *B31F 1/12* (2013.01); *D21H 19/20* (2013.01); *D21H 27/004* (2013.01)

(58) Field of Classification Search

CPC ........ D21H 27/38; D21H 13/16; D21H 13/30; D21H 27/002; D21H 27/02; D21H 27/30;

(Continued)

(56) References Cited

U.S. PATENT DOCUMENTS 10,240,296 B2 3/2019 Bailey et al.
10,786,972 B2 9/2020 Kleinwaechter et al.

(Continued)

FOREIGN PATENT DOCUMENTS

CA 3100453 C * 1/2024
WO 2017176707 A1 10/2017

(Continued)

OTHER PUBLICATIONS

PCT Search Report and Written Opinion for PCT/US2020/070709 dated Dec. 1, 2021, 9 pages.

(Continued)

*Primary Examiner* — Jose A Fortuna
(74) *Attorney, Agent, or Firm* — James E. Oehlenschlager

(57) ABSTRACT

Toilet tissue having a dynamic surface comprising a surface material that overlays a textured web material such that the toilet tissue exhibits one or more novel properties and method for making same are provided.

20 Claims, 12 Drawing Sheets

Related U.S. Application Data

(60) Provisional application No. 62/926,620, filed on Oct. 28, 2019.

(51) Int. Cl.

| | |
|---|---|
| ***B31F 1/07*** | (2006.01) |
| ***B31F 1/12*** | (2006.01) |
| ***D21H 19/20*** | (2006.01) |
| ***D21H 27/00*** | (2006.01) |

(58) Field of Classification Search

CPC .... D21H 19/824; D21H 27/004; D21H 15/06; D21H 19/20; A47K 10/16; B65H 18/08; B31F 1/07; B31F 1/12; B31F 1/16

See application file for complete search history.

(56) References Cited

U.S. PATENT DOCUMENTS

| | | | | |
|---|---|---|---|---|
| 10,814,587 | B2 | 10/2020 | Kleinwaechter et al. | |
| 11,220,790 | B2 | 1/2022 | Cabell et al. | |
| 11,591,752 | B2 * | 2/2023 | McKee | D21H 27/002 |
| 11,624,157 | B2 * | 4/2023 | McKee | A47K 10/16 162/109 |
| 11,846,073 | B2 * | 12/2023 | McKee | B32B 29/02 |
| 11,952,727 | B2 * | 4/2024 | McKee | D21H 13/30 |
| 2013/0216809 | A1 | 8/2013 | Cabell et al. | |
| 2013/0280503 | A1 | 10/2013 | Cabell et al. | |
| 2013/0280979 | A1 | 10/2013 | Mckee | |
| 2017/0007079 | A1 | 1/2017 | O'Brien Stickney et al. | |
| 2017/0009401 | A1 | 1/2017 | O'Brien Stickney et al. | |
| 2017/0282487 | A1 | 10/2017 | Cabell et al. | |
| 2017/0282517 | A1 | 10/2017 | Cabell et al. | |
| 2017/0282518 | A1 | 10/2017 | Cabell et al. | |
| 2017/0282519 | A1 | 10/2017 | Cabell et al. | |
| 2017/0282520 | A1 | 10/2017 | Cabell et al. | |
| 2017/0282521 | A1 | 10/2017 | Cabell et al. | |
| 2017/0282522 | A1 | 10/2017 | Cabell et al. | |
| 2017/0282523 | A1 | 10/2017 | Cabell et al. | |
| 2017/0282524 | A1 | 10/2017 | Cabell et al. | |
| 2017/0282525 | A1 | 10/2017 | Cabell et al. | |
| 2017/0284025 | A1 | 10/2017 | Cabell et al. | |
| 2018/0209100 | A1 | 7/2018 | Mckee et al. | |
| 2018/0209101 | A1 | 7/2018 | Cabell et al. | |
| 2020/0399803 | A1 | 12/2020 | Cabell et al. | |
| 2021/0001597 | A1 | 1/2021 | Kleinwaechter et al. | |
| 2021/0001598 | A1 | 1/2021 | Kleinwaechter et al. | |
| 2021/0123188 | A1 * | 4/2021 | McKee | D21H 19/824 |
| 2021/0123190 | A1 * | 4/2021 | McKee | D21H 27/002 |
| 2021/0370637 | A1 | 12/2021 | Kleinwaechter et al. | |
| 2022/0025583 | A1 | 1/2022 | Mckee et al. | |
| 2022/0062123 | A1 | 3/2022 | Payne et al. | |
| 2022/0072824 | A1 | 3/2022 | Kleinwaechter et al. | |
| 2022/0090329 | A1 | 3/2022 | Cabell et al. | |
| 2023/0188375 | A1 * | 6/2023 | McKee | D21H 27/30 709/206 |
| 2023/0212826 | A1 * | 7/2023 | McKee | D21H 27/02 162/141 |
| 2023/0220630 | A1 * | 7/2023 | McKee | D21H 27/002 162/129 |

FOREIGN PATENT DOCUMENTS

| | | | | |
|---|---|---|---|---|
| WO | 2021087512 | A1 | 5/2021 | |
| WO | WO-2021087513 | A1 * | 5/2021 | A47K 10/16 |

OTHER PUBLICATIONS

All Office Actions; U.S. Appl. No. 17/082,263, filed Oct. 28, 2020.

* cited by examiner

TOILET TISSUE COMPRISING A DYNAMIC SURFACE

FIELD OF THE INVENTION

The present invention relates to toilet tissue, and more particularly to a toilet tissue comprising a dynamic surface and methods for making same.

BACKGROUND OF THE INVENTION

It is known that some consumers of toilet tissue like their toilet tissue to comprise a highly textured surface. Such highly textured surfaces exhibit relatively high void volumes and surface areas that enable good cleaning and bowel movement removal during consumer use when pressure is applied by the consumer during wiping as shown in Prior Art FIGS. 1A and 1B, which show a toilet tissue 10 comprising a surface 12 wherein the surface comprises pillows 14 and knuckles 16, wherein at least one or more, for example all, of the pillows 14 exhibit a minimum dimension D of at least 890 μm (35 mils) between the adjacent knuckle edges 18 that define the minimum dimension D of the pillow(s) at the surface 12. This performance is not achieved by a toilet tissue 10 having relatively smooth, flat surfaces with low void volume, for example as shown in Prior Art FIG. 2 that comprises pillows 14 and knuckles 16 wherein the pillows 14 are present on the surface 562 pillows/in$^2$ and wherein one or more, for example all, of the pillows 14 exhibit a minimum dimension D of less than 890 μm (35 mils), or smooth, flat surfaces, for example as shown in Prior Art FIG. 3, such as a surface of a conventional wet pressed toilet tissue, during use when pressure is applied by the consumer during wiping. Therefore, a toilet tissue 10 that exhibits a highly textured surface 12 with a relatively high void volume as shown in Prior Art FIGS. 1A and 1B is desirable by consumers to provide good cleaning and bowel movement 20 removal. However, the highly textured surfaces of such known toilet tissue feels rough to the touch (not soft) prior to wiping and also during wiping.

One attempt to overcome the rough feel of highly textured surface toilet tissue 10 is to deposit a surface material 24, for example a plurality of filaments 26, such as hydroxyl polymer filaments (such as polyvinyl alcohol and/or starch) onto the surface 12 of the highly textured surface toilet tissue 10 as shown in Prior Art FIGS. 4A and 4B. Unfortunately, as shown in Prior Art FIGS. 4A and 4B, one attempt at depositing a surface material 24, for example a plurality of hydroxyl polymer filaments onto the surface 12 of a highly textured surface toilet tissue 10; namely a surface 12 comprising machine direction pillows 14 and machine direction knuckles 16 failed to provide the surface 12 with a smooth, flat surface due to the filaments collapsing into the void volume created by the machine direction (MD) pillows 14 between the machine direction (MD) knuckles 16 resulting in a rough feel for consumers much like the toilet tissue 10 shown in FIGS. 1A and 1B. The toilet tissue 10 of Prior Art FIGS. 4A and 4B exhibited an Average Line Roughness Ra of less than 50 μm and an Average Line Roughness Rq of less than 57 μm and an Initial % Contact Area of less than 50% and a Final % Contact Area of 72% as measured by the MikroCAD Test Method described herein.

In another attempt, formulators deposited a surface material, for example a plurality of filaments, such as hydroxyl polymer filaments onto a relatively smooth, flat surface with low void volume of the toilet tissue 10 as shown in Prior Art FIG. 2. Even though the surface material, for example filaments, did not collapse into the pillows 14 of the toilet tissue 10, the toilet tissue 10 did not provide good cleaning and bowel movement removal. The is evidenced by the toilet tissue 10 of Prior Art FIG. 2 exhibiting a Final % Contact Area of greater than 80%, for example about 82% as measured according to the MikroCAD Test Method described herein.

One problem with known toilet tissue is the inability of the toilet tissue to provide a dynamic surface that is relatively smooth, flat, and soft-to-the-touch prior to wiping, and then performs like a textured surface during wiping when pressure is applied by the consumer to provide good cleaning and bowel movement removal.

Accordingly, there is a need for toilet tissue that comprises a dynamic surface that feels like a relatively smooth, flat, and soft-to-the-touch prior to wiping, but then performs like a highly textured surface during wiping when pressure is applied by the consumer resulting in good cleaning and bowel movement removal. Therefore, there is a need for a toilet tissue comprising such a dynamic surface and a method for making same.

SUMMARY OF THE INVENTION

The present invention fulfills the need described above by providing a fibrous structure, for example a toilet tissue, for example a multi-ply (two or more and/or three or more fibrous structure plies) fibrous structure, for example toilet tissue that comprises a dynamic surface and a method for making same.

It has been unexpectedly found that one solution to the problem described above is to provide a toilet tissue comprising a dynamic surface by providing a toilet tissue comprising a dynamic surface formed by a combination of a first textured layer comprising one or more pillows and one or more knuckles, and a second layer formed by a surface material, which may comprise one or more layers of different surface materials. The second layer (surface material) forms a relatively smooth, flat layer upon depositing the surface material, for example a plurality of filaments, especially filaments that exhibit an average fiber diameter of less than 2 μm and/or less than 1.5 μm and/or less than 1 μm and/or less than 900 nm and/or less than 800 nm and greater than 100 nm and/or greater than 200 nm as measured according to the Surface Average Fiber Diameter Test Method described herein, for example hydroxyl polymer filaments such as polyvinyl alcohol filaments and/or starch filaments that exhibit an average fiber diameter of 4-7 μm, onto the first textured layer such that the surface material at least partially covers and/or entirely covers the first textured layer. It has been found that by the surface material at least partially covering the one or more pillows of the first textured layer by spanning the one or more pillows, for example spanning the one or more pillows from adjacent knuckle edges at a minimum length of at least 890 μm (35 mils) and/or at least 1000 μm and/or at least 1250 μm and/or to about 3000 μm and/or to about 2750 μm and/or to about 2500 μm a dynamic surface according to the present invention is formed. In other words, a dynamic surface that is relatively smooth, flat, and soft-to-the-touch prior to wiping, and then performs like a textured surface during wiping when pressure is applied by the consumer resulting in good cleaning and bowel movement removal. The first textured layer may comprise a fibrous structure comprising a three-dimensional pattern, for example a surface comprising one or more pillows, such as discrete pillows, and one or more knuckles, such as a continuous knuckle, a through-air-dried fibrous structure, and the second smooth layer may comprise a plurality of fibrous elements, for example filaments, for example hydroxyl polymer filaments, such as hydroxyl polymer filaments that exhibit an average fiber diameter of less than 2 μm and/or less than 1.5 μm and/or less than 1 μm and/or less than 900 nm and/or less than 800 nm and greater than 100 nm and/or greater than 200 nm (such as polyvinyl alcohol fibrous elements) as measured according to the Surface Average Fiber Diameter Test Method described herein and/or that exhibit an average fiber diameter of from 4-7 μm (such as starch fibrous elements). The dynamic surface according to the present invention is characterized by one or more of the following: 1) the toilet tissue exhibiting an Average Line Roughness Ra of greater than 50 μm as measured according to the MikroCAD Test Method, 2) the toilet tissue exhibiting an Average Line Roughness Rq of greater than 57 μm as measured according to the MikroCAD Test Method, 3) the toilet tissue exhibiting an Initial % Contact Area of greater than 50% and optionally, an Average Line Roughness Ra of greater than 50 μm and/or an Average Line Roughness Rq of greater than 57 μm as measured according to the MikroCAD Test Method, 4) the toilet tissue exhibiting a Final % Contact Area of less than 80% and an Average Line Roughness Ra of greater than 50 μm as measured according to the MikroCAD Test Method, 5) the toilet tissue exhibiting a Final % Contact Area of less than 80% and an Average Line Roughness Rq of greater than 57 μm as measured according to the MikroCAD Test Method, 6) the toilet tissue the toilet tissue exhibiting a Final % Contact Area of less than 72% and optionally, an Average Line Roughness Ra of greater than 50 μm and/or an Average Line Roughness Rq of greater than 57 μm as measured according to the MikroCAD Test Method, 7) the toilet tissue exhibiting an Initial % Contact Area of greater than 50% and a Final % Contact Area of less than 80% as measured according to the MikroCAD Test Method, and/or 8) the toilet tissue exhibiting an Initial % Contact Area of greater than 50% and a Final % Contact Area of less than 72% as measured according to the MikroCAD Test Method.

Without wishing to be bound by theory, it is believed that the second layer, for example the surface material, such as a plurality of fibrous elements, such as filaments, spans (bridges) the one or more pillows of the textured layer, which itself is a part of a textured fibrous structure, such as a three-dimensional patterned fibrous structure, for example a through-air-dried wet-laid web material, such that the surface material is supported on and/or by the adjacent knuckles and their respective knuckle edges such that the resulting surface is a relatively smooth, flat and soft-to-the-touch prior to wiping surface rather than a highly textured surface, which would be the case without the surface material spanning the pillows. Upon applying pressure to the dynamic surface, such as during wiping by a consumer, the second layer (surface material) deforms into the one or more pillows and thus creates available void volume and/or texture for good cleaning and bowel movement removal more akin to highly textured surface toilet tissues with such surface material.

In one example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits an Average Line Roughness Ra of greater than 50 μm as measured according to the MikroCAD Test Method described herein, is provided.

In one example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits an Average Line Roughness Rq of greater than 57 μm as measured according to the MikroCAD Test Method described herein, is provided.

In another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits an Initial % Contact Area of greater than 50% as measured according to the MikroCAD Test Method, is provided.

In another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits an Initial % Contact Area of greater than 50% and an Average Line Roughness Ra of greater than 50 μm as measured according to the MikroCAD Test Method, is provided.

In another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits an Initial % Contact Area of greater than 50% and an Average Line Roughness Rq of greater than 57 μm as measured according to the MikroCAD Test Method, is provided.

In yet another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits a Final % Contact Area of less than 72% and an Average Line Roughness Ra of greater than 50 μm as measured according to the MikroCAD Test Method, is provided.

In yet another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits a Final % Contact Area of less than 72% and an Average Line Roughness Rq of greater than 57 μm as measured according to the MikroCAD Test Method, is provided.

In yet another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits a Final % Contact Area of less than 80% and an Average Line Roughness Ra of greater than 50 μm as measured according to the MikroCAD Test Method, is provided.

In yet another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits a Final % Contact Area of less than 80% and an Average Line Roughness Rq of greater than 57 μm as measured according to the MikroCAD Test Method, is provided.

In still another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits an Initial % Contact Area of greater than 50% and a Final % Contact Area of less than 80% as measured according to the MikroCAD Test Method, is provided.

In still another example of the present invention, a toilet tissue, for example a multi-ply toilet tissue, comprising a plurality of fibrous elements, wherein the toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, such that the toilet tissue exhibits an Initial % Contact Area of greater than 50% and a Final % Contact Area of less than 72% as measured according to the MikroCAD Test Method, is provided.

In another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits an Average Line Roughness Ra of greater than 50 μm as measured according to the MikroCAD Test Method described herein, is provided.

In one example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits an Average Line Roughness Rq of greater than 57 μm as measured according to the MikroCAD Test Method described herein, is provided.

In another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits an Initial % Contact Area of greater than 50% as measured according to the MikroCAD Test Method, is provided.

In another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits an Initial % Contact Area of greater than 50% and an Average Line Roughness Ra of greater than 50 μm as measured according to the MikroCAD Test Method, is provided.

In another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits an Initial % Contact Area of greater than 50% and an Average Line Roughness Rq of greater than 57 μm as measured according to the MikroCAD Test Method, is provided.

In yet another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits a Final % Contact Area of less than 72% and an Average Line Roughness Ra of greater than 50 μm as measured according to the MikroCAD Test Method, is provided.

In yet another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits a Final % Contact Area of less than 72% and an Average Line Roughness Rq of greater than 57 μm as measured according to the MikroCAD Test Method, is provided.

In yet another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits a Final % Contact Area of less than 80% and an Average Line Roughness Ra of greater than 50 μm as measured according to the MikroCAD Test Method, is provided.

In yet another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits a Final % Contact Area of less than 80% and an Average Line Roughness Rq of greater than 57 μm as measured according to the MikroCAD Test Method, is provided.

In still another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits an Initial % Contact Area of greater than 50% and a Final % Contact Area of less than 80% as measured according to the MikroCAD Test Method, is provided.

In still another example of the present invention, a multi-ply toilet tissue comprising a plurality of fibrous elements, wherein the multi-ply toilet tissue comprises a dynamic surface, wherein the dynamic surface comprises a surface material comprising a plurality of hydroxyl polymer filaments that overlays a textured first web material, such as a fibrous structure, for example a three-dimensional patterned fibrous structure such as a through-air-dried wet-laid fibrous structure, and wherein the multi-ply toilet tissue comprises a second web material associated with, for example bonded to, the textured first web material such that the multi-ply toilet tissue exhibits an Initial % Contact Area of greater than 50% and a Final % Contact Area of less than 72% as measured according to the MikroCAD Test Method, is provided.

In even another example of the present invention, a roll of fibrous structure, for example a roll of toilet tissue of the present invention may comprise the toilet tissue, for example a multi-ply (two or more or three or more fibrous structure plies) toilet tissue of the present invention, is provided.

In even yet another example of the present invention, a package, for example a film overwrap such as polyolefin film wrapper, for example polyethylene film wrapper, a film bag such as a polyolefin film bag, for example polyethylene film bag, and/or for example cartonboard, such as cellulose fiber cartonboard, and/or for example corrugated board or cardboard, for example cellulose fiber corrugated board or cellulose fiber cardboard of toilet tissue, for example multi-ply toilet tissue, according to the present invention comprises one or more rolls of toilet tissue, for example rolls of multi-ply (two or more or three or more fibrous structure plies) toilet tissue of the present invention, is provided.

In even still another example of the present invention, a plastic-free package, for example cartonboard, such as cellulose fiber cartonboard, and/or for example corrugated board or cardboard, for example cellulose fiber corrugated board or cellulose fiber cardboard of toilet tissue, for example multi-ply toilet tissue, according to the present invention comprises one or more rolls of toilet tissue, for example rolls of multi-ply (two or more or three or more fibrous structure plies) toilet tissue of the present invention, is provided.

In even yet another example of the present invention, a method for making a fibrous structure, for example a toilet tissue, for example a multi-ply (two or more or three or more fibrous structure plies) toilet tissue of the present invention comprising the steps of:

a. providing a textured first web material, for example a textured first fibrous structure ply comprising a plurality of fibrous elements;
b. depositing a surface material, for example a plurality of fibrous elements, such as filaments, such as hydroxyl polymer filaments, for example hydroxyl polymer filaments that exhibit and average fiber diameter of less than 2 μm and/or less than 1.5 μm and/or less than 1 μm and/or less than 900 nm and/or less than 800 nm and greater than 100 nm and/or greater than 200 nm (polyvinyl alcohol filaments) as measured according to the Surface Average Fiber Diameter Test Method described herein and optionally from 4-7 μm (starch filaments), onto a surface of the textured first web material such that a dynamic surface comprising the surface material that overlays the surface of the textured first web material is formed resulting in the toilet tissue exhibiting one or more of the following properties:

a. an Average Line Roughness Ra of greater than 50 μm;
b. an Average Line Roughness Rq of greater than 57 μm;
c. an Initial % Contact Area of greater than 50%;
d. a Final % Contact Area of less than 80%; and
e. a Final % Contact Area of less than 72%, as measured according to the MikroCAD Test Method described herein, is provided.

In even still another example of the present invention, a method for making a multi-ply (two or more or three or more fibrous structure plies) toilet tissue of the present invention comprising the steps of:

a. providing a textured first web material, for example a textured first fibrous structure ply comprising a plurality of fibrous elements;
b. depositing a surface material, for example a plurality of fibrous elements, such as filaments, such as hydroxyl polymer filaments, for example hydroxyl polymer filaments that exhibit and average fiber diameter of less than 2 μm and/or less than 1.5 μm and/or less than 1 μm and/or less than 900 nm and/or less than 800 nm and greater than 100 nm and/or greater than 200 nm (polyvinyl alcohol filaments) as measured according to the Surface Average Fiber Diameter Test Method described herein and optionally 4-7 μm (starch filaments), onto a surface of the textured first web material such that a dynamic surface comprising the surface material that overlays the surface of the textured first web material is formed resulting in the multi-ply toilet tissue exhibiting one or more of the following properties:
   a. an Average Line Roughness Ra of greater than 50 μm;
   b. an Average Line Roughness Rq of greater than 57 μm;
   c. an Initial % Contact Area of greater than 50%;
   d. a Final % Contact Area of less than 80%; and
   e. a Final % Contact Area of less than 72%, as measured according to the MikroCAD Test Method described herein; and
c. associating with, for example bonding to, the textured first web material a second web material to form a multi-ply toilet tissue, is provided.

In another example of the present invention, a method for making a roll of toilet tissue, for example a multi-ply (two or more or three or more fibrous structure plies) toilet tissue of the present invention may comprise the steps of:

a. providing a toilet tissue, for example a multi-ply toilet tissue according to the present invention; and
b. winding the toilet tissue, for example multi-ply toilet tissue, into a roll of toilet tissue or multi-ply toilet tissue, is provided.

The present invention provides a toilet tissue, for example a multi-ply (two or more or three or more fibrous structure plies) toilet tissue comprising a dynamic surface such that the toilet tissue, for example a multi-ply toilet tissue, exhibits one or more of the following properties:

a. an Average Line Roughness Ra of greater than 50 μm;
b. an Average Line Roughness Rq of greater than 57 μm;
c. an Initial % Contact Area of greater than 50%;
d. a Final % Contact Area of less than 80%; and
e. a Final % Contact Area of less than 72%, as measured according to the MikroCAD Test Method described herein, rolls of such toilet tissue, packages comprising one or more of such rolls of toilet tissue, and methods for making such toilet tissue and rolls of such toilet tissue.

DETAILED DESCRIPTION OF THE INVENTION

Definitions

Figure 1A:
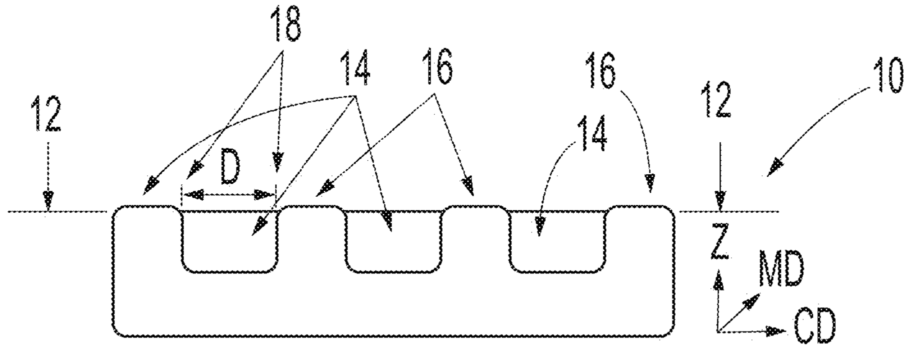
Fig. 1A PRIOR ART
FIG. 1A is a cross-section representation of an example of a highly textured surface prior art toilet tissue.
Figure 1B:
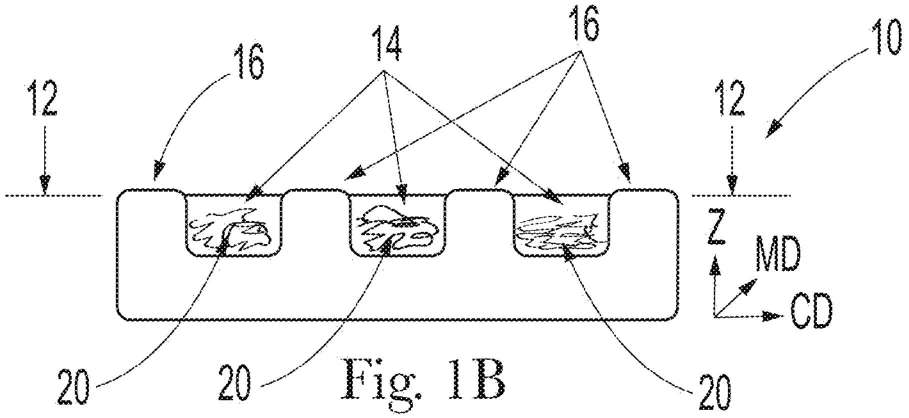
Fig. 1B PRIOR ART
FIG. 1B is the cross-section representation of FIG. 1A schematically showing bowel movement present in the void volume (pillows) of the prior art toilet tissue after wiping.
Figure 2:
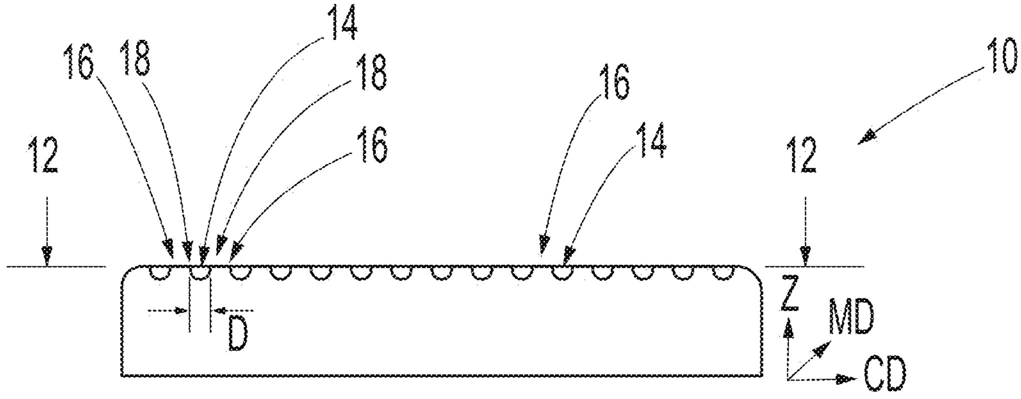
Fig. 2 PRIOR ART
FIG. 2 is a cross-section representation of an example of a relatively smooth, flat, and soft-to-the-touch prior art tissue.
Figure 3:
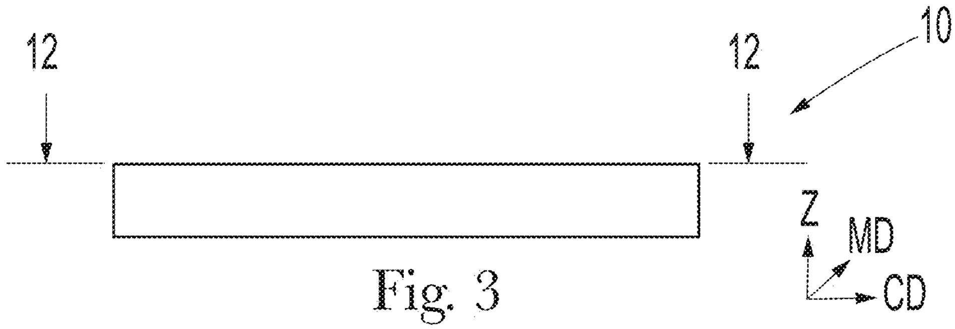
Fig. 3 PRIOR ART
FIG. 3 is a cross-section representation of an example of a smooth, flat, and soft-to-the-touch prior art toilet tissue.

"Fibrous element" as used herein means an elongate particulate having a length greatly exceeding its average diameter, i.e. a length to average diameter ratio of at least about least about 10 and/or at least about 100 and/or at least about 1000 and/or up to 5000. A fibrous element may be a filament or a fiber. In one example, the fibrous element is a single fibrous element rather than a yarn comprising a plurality of fibrous elements.

The fibrous elements of the present invention may be spun from polymer melt compositions, for example polymer solutions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.). The filament may exhibit a length to average diameter ratio of at least about 100 and/or at least about 1000 and/or up to 5000.

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments, polyesteramide filaments, and polycaprolactone filaments. The filaments may be monocomponent or multicomponent, such as bicomponent filaments.

Filaments, for example spun filaments, may be used directly as filaments and/or may be cut into staple fibers and used as staple fibers. In one example, the fibrous structure may comprise pre-formed staple fibers, that may have been previously spun into filaments and cut into staple fibers by a third party before the fibrous structure manufacturer uses the resulting staple fibers in making the fibrous structure, for example toilet tissue of the present invention.

"Fiber" as used herein means an elongate particulate as described above that exhibits a length of less than 5.08 cm (2 in.) and/or less than 3.81 cm (1.5 in.) and/or less than 2.54 cm (1 in.). The fiber may exhibit a length to average diameter ratio of less than 100 and/or less than about 50 and/or less than about 25 and/or about 10.

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, lyocell, nylon, glass fibers and polyvinyl alcohol fibers.

Staple fibers may be produced by spinning a filament tow and then cutting the tow into segments of less than 5.08 cm (2 in.) thus producing fibers; namely, staple fibers. Staple fibers may also be in the form of a pre-formed staple fiber web that itself can be used as a web material, such as a surface material, in the fibrous structure, for example toilet tissue of the present invention. Alternatively, the pre-formed staple fiber web may be subject to processing to separate and individualize the staple fibers from the web structure thus resulting in individual staple fibers, which may then be used in the fibrous structure, for example toilet tissue of the present invention.

In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: *eucalyptus* fibers, acacia fibers, and mixtures thereof. The northern hardwood pulp fibers may be selected from the group consisting of: cedar fibers, maple fibers, aspen fibers, and mixtures thereof.

In addition to the various wood pulp fibers, other cellulosic fibers such as cotton linters, rayon, lyocell, trichomes, seed hairs, and bagasse fibers can be used in this invention. Other sources of cellulose in the form of fibers or capable of being spun into filaments and used as filaments and/or where the filaments are cut into staple fibers before use, and/or spun directly into fibers and/or naturally-occurring fibers include grasses and grain sources.

Further, other fibers, such as recycled fibers may be used in the fibrous structures, for example toilet tissue of the present invention.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristle-like outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp.

Further trichome fibers are different from monocotyledonous plant derived fibers such as those derived from cereal straws (wheat, rye, barley, oat, etc), stalks (corn, cotton, sorghum, Hesperaloe funifera, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Fibrous structure" as used herein means a structure that comprises a web material comprising a plurality of fibrous elements, for example a plurality of fibers, such as a plurality of pulp fibers, such as wood pulp fibers and/or non-wood pulp fibers, for example plant fibers, synthetic staple fibers, and mixtures thereof. In addition to pulp fibers, the web material may comprise a plurality of fibrous elements, such as filaments, such as polymeric filaments, for example thermoplastic filaments such as polyolefin filaments (i.e., polypropylene filaments), polyester filament, polyethylene terephthalate (PET) filaments and/or hydroxyl polymer filaments, for example polyvinyl alcohol filaments and/or polysaccharide filaments such as starch filaments, such as in the form of a coform web material where the fibers and filaments are commingled together and/or are present as discrete or substantially discrete layers within the web material. A web material according to the present invention means an orderly arrangement of fibers alone and/or with filaments within a structure in order to perform a function. A fibrous structure according to the present invention means an association of fibrous elements that together form a structure capable of performing a function. A fibrous structure may comprise a plurality of inter-entangled fibrous elements, for example inter-entangled filaments. Non-limiting examples of web materials of the present invention include paper. The fibrous structure may be in roll form.

Non-limiting examples of processes for making the web material of the fibrous structures of the present invention include known wet-laid papermaking processes, for example conventional wet-pressed (CWP) papermaking processes and structure paper-making processes, for example through-air-dried (TAD), both creped TAD and uncreped TAD papermaking processes, fabric-creped papermaking processes, belt-creped papermaking processes, ATMOS papermaking processes, NTT papermaking processes, and air-laid papermaking processes. Such processes typically include steps of preparing a fiber composition in the form of a fiber suspension in a medium, either wet, more specifically aqueous medium, or dry, more specifically gaseous, i.e. with air as medium. The aqueous medium used for wet-laid processes is oftentimes referred to as a fiber slurry. The fiber slurry is then used to deposit a plurality of the fibers onto a forming wire, fabric, or belt such that an embryonic web material is formed, after which drying and/or bonding the fibers together results in a web material, for example the web material. Further processing of the web material may be carried out such that a finished web material is formed. For example, in typical papermaking processes, the finished web material is the web material that is wound on the reel at the end of papermaking, often referred to as a parent roll, and may subsequently be converted into a finished fibrous structure of the present invention, e.g. a single- or multi-ply fibrous structure and/or a single- or multi-ply toilet tissue.

The web material is a coformed web material comprising a plurality of fibrous elements, such as filaments, and a plurality of fibers commingled together as a result of a coforming process. "Basis Weight" as used herein is the weight per unit area of a sample reported in lbs/3000 $ft^2$ or $g/m^2$ (gsm) and is measured according to the Basis Weight Test Method described herein.

"Machine Direction" or "MD" as used herein means the direction parallel to the flow of the fibrous structure through the fibrous structure making machine and/or toilet tissue manufacturing equipment.

"Cross Machine Direction" or "CD" as used herein means the direction parallel to the width of the fibrous structure making machine and/or toilet tissue manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply toilet tissue. It is also contemplated that an individual, integral fibrous structure can effectively form a multi-ply fibrous structure, for example, by being folded on itself.

"Embossed" as used herein with respect to a web material, a fibrous structure, and/or a toilet tissue means that a web material, a fibrous structure, and/or a toilet tissue has been subjected to a process which converts a smooth surfaced web material, fibrous structure, and/or toilet tissue to a decorative surface by replicating a design on one or more emboss rolls, which form a nip with another roll and/or belt and/or fabric, through which the web material, fibrous structure, and/or toilet tissue passes. Embossed does not include creping, microcreping, printing, rush transfer, wet transfer, fabric creping, belt creping or other processes that may also impart a texture and/or decorative pattern to a web material, a fibrous structure, and/or a toilet tissue.

"Differential density", as used herein, means a web material that comprises one or more regions of relatively low fiber density, which are referred to as pillow regions, and one or more regions of relatively high fiber density, which are referred to as knuckle regions.

"Densified", as used herein means a portion of a fibrous structure and/or toilet tissue that is characterized by regions of relatively high fiber density (knuckle regions).

"Non-densified", as used herein, means a portion of a fibrous structure and/or toilet tissue that exhibits a lesser density (one or more regions of relatively lower fiber density) (pillow regions) than another portion (for example a knuckle region) of the fibrous structure and/or toilet tissue.

"Non-rolled" as used herein with respect to a fibrous structure and/or toilet tissue of the present invention means that the fibrous structure and/or toilet tissue is an individual sheet (for example not connected to adjacent sheets by perforation lines. However, two or more individual sheets may be interleaved with one another) that is not convolutedly wound about a core or itself.

"Creped" as used herein means creped off of a Yankee dryer or other similar roll and/or fabric creped and/or belt creped. Rush transfer of a fibrous structure alone does not result in a "creped" fibrous structure or "creped" toilet tissue for purposes of the present invention.

"Toilet tissue" as used herein means a soft, relatively low density fibrous structure, for example a single-ply or multi-ply (two or more or three or more fibrous structure plies) fibrous structure, for example toilet tissue useful as a wiping implement for post-urinary and post-bowel movement cleaning. In one example, the toilet tissue is flushable and/or dispersible in municipal sewer systems and/or septic systems. The toilet tissue may be convolutedly wound upon itself about a core or without a core to form a toilet tissue roll (roll of toilet tissue) or may be in the form of discrete sheets, which may be stacked and/or inter-folded or interleaved. When in the form of a roll of toilet tissue, the roll of toilet tissue may exhibit a roll compressibility (% Compressibility) as measured according to the Roll Compressibility Test Method described herein of from about 4% to about 8% and/or from about 4% to about 7% and/or from about 4% to about 6%.

In one example, the toilet tissue of the present invention comprises one or more fibrous structures, which may comprise a surface material according to the present invention.

The toilet tissue and/or fibrous structures of the present invention making up the toilet tissue may exhibit a basis weight between about 1 g/m$^2$ to about 5000 g/m$^2$ and/or from about 10 g/m$^2$ to about 500 g/m$^2$ and/or from about 10 g/m$^2$ to about 300 g/m$^2$ and/or from about 10 g/m$^2$ to about 120 g/m$^2$ and/or from about 15 g/m$^2$ to about 110 g/m$^2$ and/or from about 20 g/m$^2$ to about 100 g/m2 and/or from about 30 to 90 g/m$^2$ as determined by the Basis Weight Test Method described herein. In addition, the toilet tissue of the present invention may exhibit a basis weight between about 10 g/m$^2$ to about 120 g/m$^2$ and/or from about 10 g/m$^2$ to about 80 g/m$^2$ and/or from about 10 to about 60 g/m$^2$ and/or from about 10 g/m$^2$ to about 55 g/m$^2$ and/or from about 20 g/m$^2$ to about 55 g/m$^2$ as determined by the Basis Weight Test Method described herein.

The toilet tissue of the present invention may exhibit a total dry tensile strength of greater than about 59 g/cm (greater than about 150 g/in) and/or greater than about 78 g/cm (greater than about 200 g/in) and/or greater than about 98 g/cm (greater than about 250 g/in) and/or greater than about 138 g/cm (greater than about 350 g/in) and/or from about 78 g/cm (about 200 g/in) to about 394 g/cm (about 1000 g/in) and/or from about 98 g/cm (about 250 g/in) to about 335 g/cm (about 850 g/in). In addition, the toilet tissue of the present invention may exhibit a total dry tensile strength of greater than about 196 g/cm (greater than about 500 g/in) and/or from about 196 g/cm (about 500 g/in) to about 394 g/cm (about 1000 g/in) and/or from about 216 g/cm (about 550 g/in) to about 335 g/cm (about 850 g/in) and/or from about 236 g/cm (about 600 g/in) to about 315 g/cm (about 800 g/in). In one example, the toilet tissue exhibits a total dry tensile strength of less than about 394 g/cm (less than about 1000 g/in) and/or less than about 335 g/cm (less than about 850 g/in).

The toilet tissue of the present invention may exhibit a density of less than 0.60 g/cm$^3$ and/or less than 0.30 g/cm$^3$ and/or less than 0.20 g/cm$^3$ and/or less than 0.15 g/cm$^3$ and/or less than 0.10 g/cm$^3$ and/or less than 0.07 g/cm$^3$ and/or less than 0.05 g/cm$^3$ and/or from about 0.01 g/cm$^3$ to about 0.20 g/cm$^3$ and/or from about 0.02 g/cm$^3$ to about 0.15 g/cm$^3$ and/or from about 0.02 g/cm$^3$ to about 0.10 g/cm$^3$.

The toilet tissue of the present invention may be in the form of toilet tissue rolls. Such toilet tissue rolls may comprise a plurality of connected, but perforated sheets of fibrous structure, that are separably dispensable from adjacent sheets.

The toilet tissue and/or fibrous structures making up the toilet tissue of the present invention may comprise additives such as softening agents, temporary wet strength agents, permanent wet strength agents, bulk softening agents, lotions, silicones, wetting agents, latexes, patterned latexes and other types of additives suitable for inclusion in and/or on toilet tissue. In one example, the toilet tissue may be void of permanent wet strength and/or comprise a temporary wet strength agent and/or exhibit an initial total wet tensile of less than 200 g/in "Hydroxyl polymer" as used herein includes any hydroxyl-containing polymer that can be incorporated into a filament of the present invention. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Chemically different" as used herein with respect to two hydroxyl polymers means that the hydroxyl polymers are at least different structurally, and/or at least different in properties and/or at least different in classes of chemicals, for example polysaccharides, such as starch, versus non-polysaccharides, such as polyvinyl alcohol, and/or at least different in their respective solubility parameters.

"Non-thermoplastic" as used herein means, with respect to a material, such as a fibrous element as a whole and/or a polymer, such as a crosslinked polymer, within a fibrous element, that the fibrous element and/or polymer exhibits no melting point and/or softening point, which allows it to flow under pressure, in the absence of a plasticizer, such as water, glycerin, sorbitol, urea and the like.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in fibrous element. In one example, "non-cellulose-containing" means that less than 5% and/or less than 3% and/or less than 1% and/or less than 0.1% and/or 0% by weight of cellulose polymer is present in fibrous element.

"Fast wetting surfactant" and/or "fast wetting surfactant component" and/or "fast wetting surfactant function" as used herein means a surfactant and/or surfactant component, such as an ion from a fast wetting surfactant, for example a sulfosuccinate diester ion (anion), that exhibits a Critical Micelle Concentration (CMC) of greater 0.15% by weight and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight.

"Polymer melt composition" or "Polysaccharide melt composition" as used herein means a composition comprising water and a melt processed polymer, such as a melt processed fibrous element-forming polymer, for example a melt processed hydroxyl polymer, such as a melt processed polysaccharide.

"Melt processed fibrous element-forming polymer" as used herein means any polymer, which by influence of elevated temperatures, pressure and/or external plasticizers may be softened to such a degree that it can be brought into a flowable state, and in this condition, may be shaped as desired.

"Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition, may be shaped as desired.

"Blend" as used herein means that two or more materials, such as a fibrous element-forming polymer, for example a hydroxyl polymer and a polyacrylamide are in contact with each other, such as mixed together homogeneously or non-homogeneously, within a filament. In other words, a filament formed from one material, but having an exterior coating of another material is not a blend of materials for purposes of the present invention. However, a fibrous element formed from two different materials is a blend of materials for purposes of the present invention even if the fibrous element further comprises an exterior coating of a material.

"Associate," "Associated," "Association," and/or "Associating" as used herein with respect to fibrous elements and/or with respect to a surface and/or surface material comprising fibrous elements, such as filaments, being associated with a fibrous structure and/or a web material and/or a layer being associated with another layer within a layered fibrous structure means combining, either in direct contact or in indirect contact, fibrous elements and/or a surface material with a web material such that a fibrous structure is formed. In other words, "layered" in this context means the fibrous structure is not made up of separate plies of fibrous structures or web materials that are laminated and/or adhesively bonded with one another to form a multi-ply fibrous structure, but rather is made up of a web material upon which a surface material (not in the form of a pre-formed web material, but rather in the form of fibrous elements, such as filaments) is deposited, directly or indirectly, onto the web material. In one example, the associated fibrous elements and/or associated surface material may be bonded to the web material, directly or indirectly, for example by adhesives and/or thermal bonds to form adhesive sites and/or thermal bond sites, respectively, within the fibrous structure. In another example, the fibrous elements and/or surface material may be associated with the web material, directly or indirectly, by being deposited onto the same web material making belt.

"Average Diameter" as used herein, with respect to a fibrous element, is measured according to the Average Diameter Test Method described herein. In one example, a fibrous element, for example a filament, of the present invention exhibits an average diameter of less than 50 μm and/or less than 25 μm and/or less than 20 μm and/or less than 15 μm and/or less than 10 μm and/or less than 6 μm and/or greater than 1 μm and/or greater than 3 μm.

"3D pattern" with respect to a fibrous structure and/or toilet tissue's surface in accordance with the present invention means herein a pattern that is present on at least one surface of the fibrous structure and/or toilet tissue. The 3D pattern texturizes the surface of the fibrous structure and/or toilet tissue, for example by providing the surface with protrusions and/or depressions. The 3D pattern on the surface of the fibrous structure and/or toilet tissue is made by making the toilet tissue or at least one fibrous structure ply employed in the toilet tissue on a patterned molding member that imparts the 3D pattern to the toilet tissue and/or fibrous structure plies made thereon.

"Water-resistant" as it refers to a surface pattern or part thereof means that a 3D pattern retains its structure and/or integrity after being saturated by water and the 3D pattern is still visible to a consumer. In one example, the 3D pattern may be water-resistant.

"Wet textured" as used herein means that a 3D patterned fibrous structure ply comprises texture (for example a three-dimensional topography) imparted to the fibrous structure and/or fibrous structure's surface during a fibrous structure making process, for example resulting in a patterned wet laid fibrous structure, such as a wet-formed patterned wet laid fibrous structure. In one example, in a wet-laid fibrous structure making process, wet texture can be imparted to a fibrous structure upon fibers and/or filaments being collected on a collection device that has a three-dimensional (3D) surface which imparts a 3D surface to the fibrous structure being formed thereon and/or being transferred to a fabric and/or belt, such as a structuring fabric, for example a through-air-drying fabric and/or a patterned belt, comprising a 3D surface that imparts a 3D surface to a fibrous structure being formed thereon. In one example, the collection device with a 3D surface comprises a patterned, such as a pattern formed by a polymer or resin being deposited onto a base substrate, such as a fabric, in a patterned configuration. The wet texture imparted to a wet-laid fibrous structure is formed in the fibrous structure prior to and/or during drying of the fibrous structure. Non-limiting examples of collection devices and/or fabric and/or belts suitable for imparting wet texture to a fibrous structure include those fabrics and/or belts used in fabric creping and/or belt creping processes, for example as disclosed in U.S. Pat. Nos. 7,820,008 and 7,789,995, coarse through-air-drying fabrics as used in uncreped through-air-drying processes, and photo-curable resin patterned through-air-drying belts, for example as disclosed in U.S. Pat. No. 4,637,859. Other structuring processes and/or structuring fabrics and/or structuring belts and/or patterned fabrics and/or patterned belts, for example three-dimensional printed structuring belts include, but are not limited to structured fabrics (weave pattern, mesh, count, warp and weft monofilament diameters, caliper, air permeability, and optional over-laid polymer), which are generally disclosed in U.S. Pat. Nos. 10,099,425 and 10,208,426, which are incorporated herein by reference, which may be an imprinting fabric, which is similar to a forming fabric, except for the addition of an overlaid polymer. These types of structured fabrics are disclosed in patents such as U.S. Pat. Nos. 5,679,222; 4,514,345; 5,334,289; 4,528,239; and 4,637,859, the disclosures of which are hereby incorporated by reference in their entirety. Essentially, fabrics produced using these methods result in a fabric with a patterned resin applied over a woven substrate. The benefit is that resulting patterns are not limited by a woven structure and can be created in any desired shape to enable a higher level of control of the web structure and topography that dictate web quality properties. Another example of a structure fabric comprises a patterned resin applied over a woven substrate. The patterned resin completely penetrates the woven substrate. The top surface of the patterned resin is flat and openings in the resin have sides that follow a linear path as the sides approach and then penetrate the woven structure. U.S. Pat. Nos. 6,610,173, 6,660,362, 6,998,017, and European Patent No. EP 1 339 915, all of which are incorporated herein by reference, disclose another technique for applying an overlaid resin to a woven imprinting fabric. In addition to the above, the ATMOS manufacturing technique is often described as a hybrid technology because it utilizes a structured fabric like the TAD process, but also utilizes energy efficient means to dewater the sheet like the conventional dry crepe process. Other manufacturing techniques which employ the use of a structured fabric along with an energy efficient dewatering process are the ETAD process and NTT process. The ETAD process and products are described in U.S. Pat. Nos. 7,339,378, 7,442,278, and 7,494,563. The NTT process and products are described in WO 2009/061079 A1, US Patent Application Publication No. 2011/0180223 A1, and US Patent Application Publication No. 2010/0065234 A1, which are incorporated herein by reference. The QRT process is described in US Patent Application Publication No. 2008/0156450 A1 and U.S. Pat. No. 7,811,418, which are incorporated herein by reference. A structuring belt manufacturing process used for the NTT, QRT, and ETAD imprinting process is described in U.S. Pat. No. 8,980,062 and U.S. Patent Application Publication No. US 2010/0236034, which are incorporated herein by reference. Examples of structuring belts used in the NTT process can be viewed in International Publication Number WO 2009/067079 A1 and US Patent Application Publication No. 2010/0065234 A1, which are incorporated herein by reference.

Wet texture is different from non-wet texture that is imparted to a fibrous structure after the fibrous structure has been dried, for example after the moisture level of the fibrous structure is less than 15% and/or less than 10% and/or less than 5%. An example of non-wet texture includes embossments imparted to a fibrous structure by embossing rolls during converting of the fibrous structure.

“Dynamic Surface” as used herein means a surface that changes its state and/or function when exposed to different external forces.

As used herein, the articles “a” and “an” when used herein, for example, “an anionic surfactant” or “a fiber” is understood to mean one or more of the materials that are claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Toilet Tissue

Figure 5A:
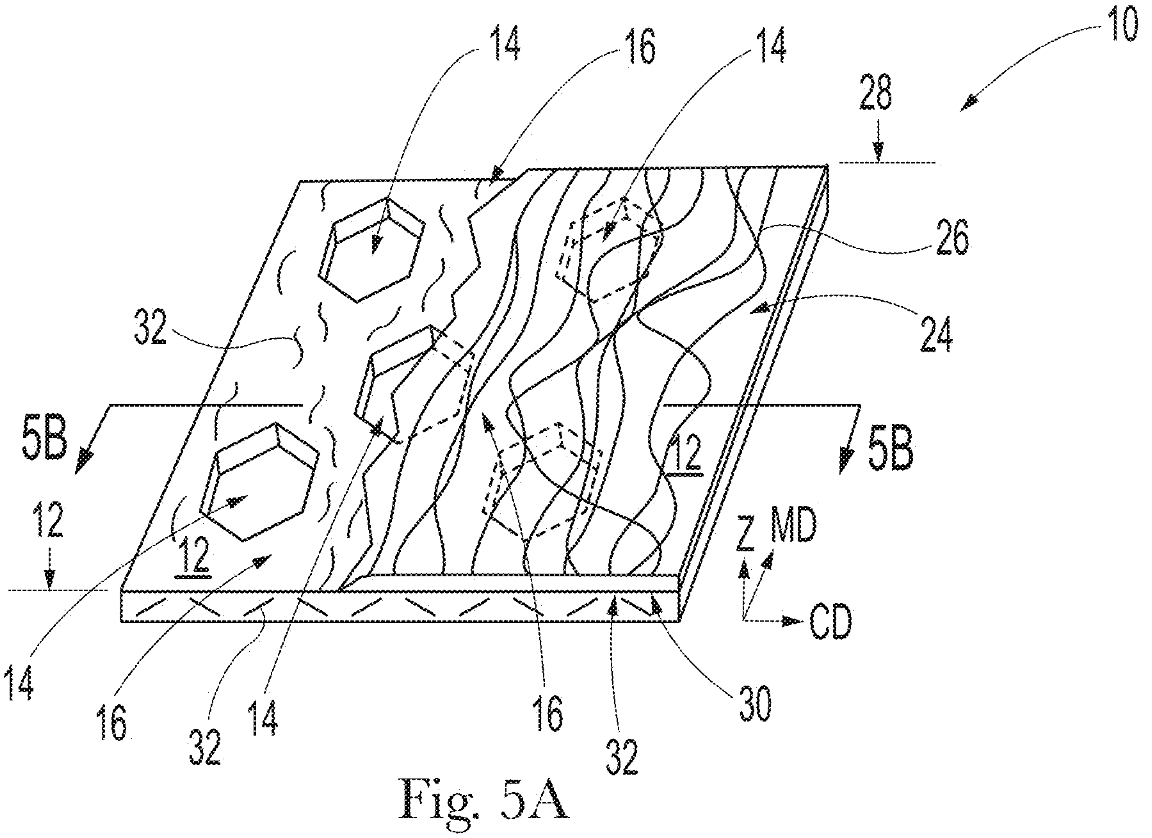
FIG. 5A is a schematic representation of an example of a toilet tissue according to the present invention.
Figure 5B:
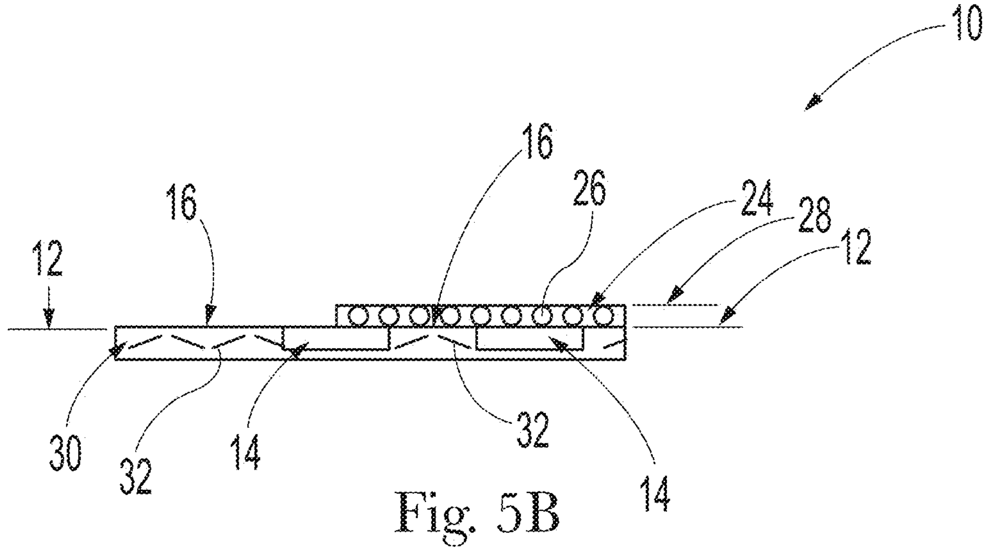
FIG. 5B is a cross-section representation of FIG. 5A illustrating the dynamic surface prior to wiping.
Figure 5C:
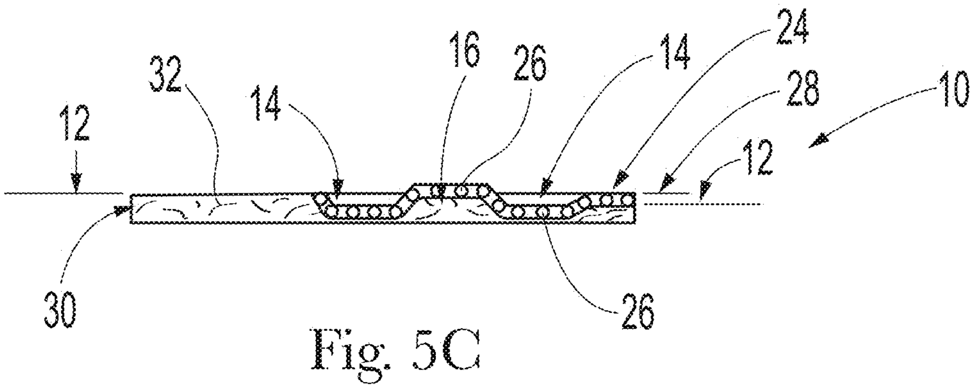
FIG. 5C is a cross-section representation of FIG. 5A illustrating the dynamic surface after wiping (the bowel movement is not shown)
Figure 5D:
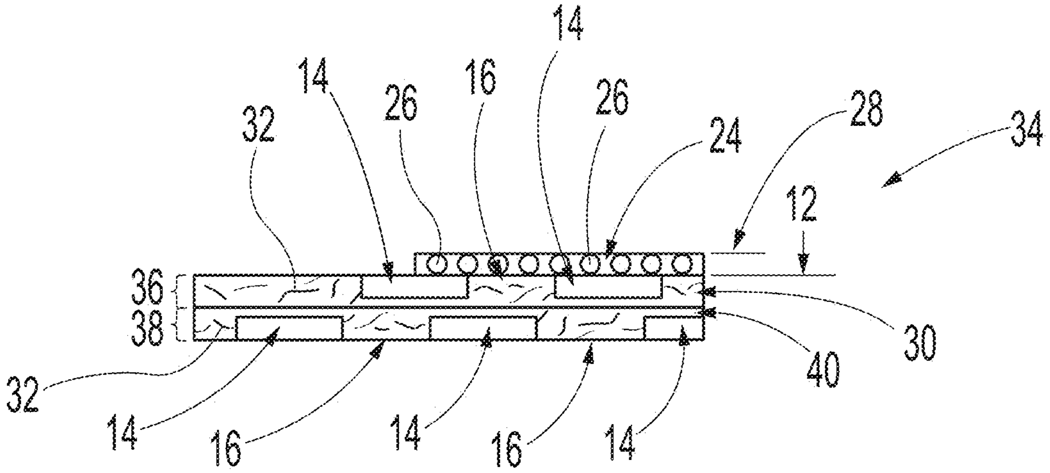
FIG. 5D is a cross-section representation of FIG. 5B in a multi-ply toilet tissue form.

As shown in FIGS. 5A-5D, in one example, the toilet tissue 10 of the present invention comprises a plurality of fibrous elements, for example filaments and/or fibers, and wherein the toilet tissue 10 comprises a dynamic surface 28 (an exterior surface of the toilet tissue 10, or example the consumer-contacting surface of the toilet tissue 10) comprising a surface material 24 comprising a plurality of fibrous elements, for example a plurality of hydroxyl polymer filaments 26, such as polyvinyl alcohol filaments and/or polysaccharide, for example starch filaments, that overlays a surface 12 of a web material, for example a first web material, such as a textured first web material 30, which may be a fibrous structure comprising a plurality of fibrous elements, for example a plurality of fibers 32 (for example pulp fibers, such as wood pulp fibers). The fibrous structure may be a three-dimensional patterned fibrous structure such as a through-air-dried wet-laid fibrous structure. In this example, the textured first web material 30 comprises one or more pillows 14 and one or more knuckles 16. The surface material 24, for example the hydroxyl polymer filaments 26 span and/or bridge (in other words span from one knuckle and/or knuckle edge to an adjacent knuckle and/or adjacent knuckle edge, for example wherein the span is at least 890 μm and/or at least 1000 μm and/or at least 1250 μm and/or to about 3000 μm and/or to about 2750 μm and/or to about 2500 μm) one or more of the pillows 14 on the surface 12 of the textured first web material 30 such that a relatively smooth, flat, soft-to-the touch dynamic surface 28 is formed in the pre-wiping state. In this example, the textured first web material 30 comprises a continuous knuckle and discontinuous, discrete pillows and the surface 28 comprises the continuous knuckle. The dynamic surface 28 exhibits at least two states, one prior to wiping (pre-wiping state) and/or prior to application of pressure as shown in FIGS. 5A, 5B and 5D, and another state (during and/or post-post wiping and/or during and/or post-use state) wherein at least a portion of the dynamic surface 28 is deflected into one or more of the pillows 14 as shown and described in FIG. 5C.

In one example (not shown), the surface material, for example the hydroxyl polymer filaments span and/or bridge (in other words span from one pillow and/or pillow edge to an adjacent pillow and/or adjacent pillow edge, for example wherein the span is at least 890 μm and/or at least 1000 μm and/or at least 1250 μm and/or to about 3000 μm and/or to about 2750 μm and/or to about 2500 μm) one or more of the knuckles on the surface of the textured first web material such that a relatively smooth, flat, soft-to-the touch surface 28 is formed in the pre-wiping state. In this example, the textured first web material 30 comprises a continuous pillow and discontinuous, discrete knuckles and the surface 28 comprises the continuous pillow.

In another example (not shown), the textured first web material may comprise one or more semi-continuous pillows and/or one or more semi-continuous knuckles, such as machine direction-oriented and/or cross machine direction-oriented, linear and/or sinusoidal or curvilinear semi-continuous pillows and semi-continuous knuckles across which the surface material spans and/or bridges so long as the semi-continuous knuckles and semi-continuous pillows are size, arranged, and/or oriented to avoid the surface material collapsing (for example as shown in Prior Art FIGS. 4A and 4B) into the semi-continuous knuckles or semi-continuous pillows depending on which the surface comprises because the surface of the textured first web material may comprise either the semi-continuous knuckles or the semi-continuous pillows.

In another example (not shown), the textured first web material may be oriented such that the surface comprises knuckles or pillows.

Figure 4A:
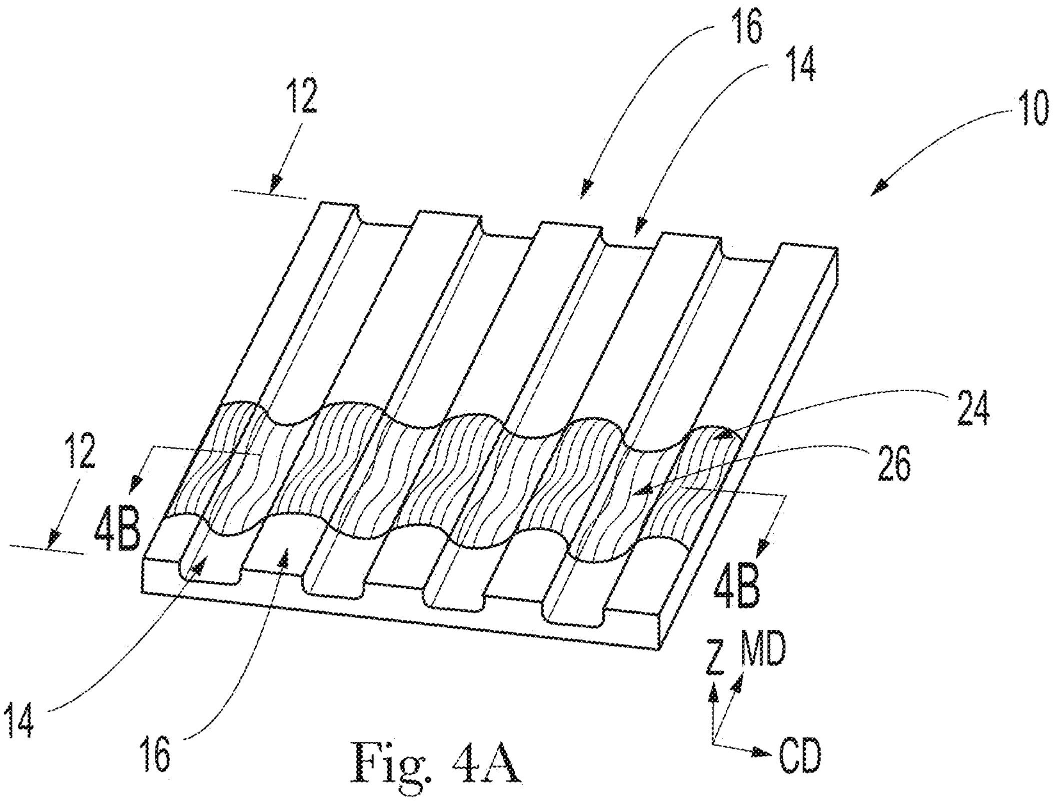
Fig. 4A PRIOR ART
FIG. 4A is a schematic representation of an example of a highly textured surface prior art tissue comprising a surface material.
Figure 4B:
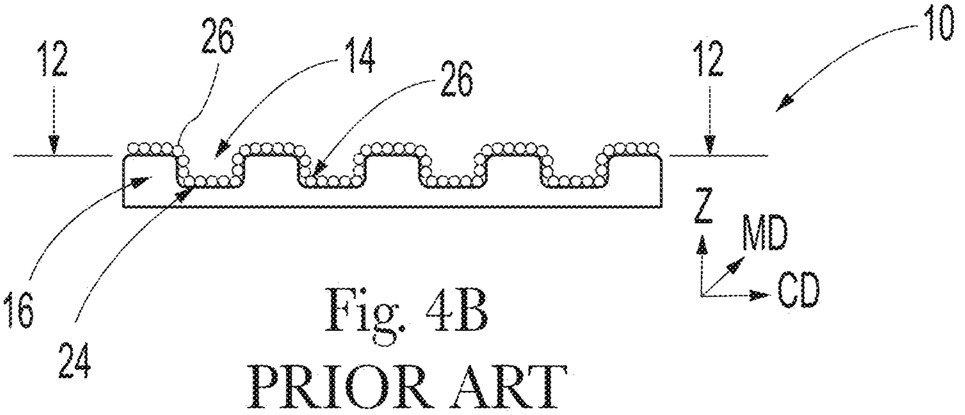
Fig. 4B PRIOR ART
FIG. 4B is a cross-section representation of FIG. 4A.

FIG. 5D shows an example of a multi-ply toilet tissue 34 comprising a first ply 36, for example a toilet tissue 10 as shown and described in FIGS. 5A-5C, and a second ply 38, which may comprise a second web material 40, such as a textured second web material (as shown and described in FIG. 5D), for example a fibrous structure comprising a plurality of fibrous elements, for example a plurality of fibers 32 (for example pulp fibers, such as wood pulp fibers). The second web material fibrous structure may be), for example a three-dimensional patterned fibrous structure such as a through-air-dried wet-laid fibrous structure. In one example, the second web material 40 is the same as the textured first web material 30, with or without the inclusion of a surface material 24. In another example, the second web material 40 is different from the textured first web material 30 may comprise one of the prior art toilet tissues shown and described in Prior Art FIGS. 1A-4B, with or without a surface material 24.

In one example the toilet tissue 10 and/or multi-ply toilet tissue 34 and/or web material, for example the textured first web material 30 and/or second web material 40 may be embossed, for example with a pattern, such as a non-random repeating pattern. The toilet tissue 10 and/or multi-ply toilet tissue 34 and/or web material, for example the textured first web material 30 and/or second web material 40 of the present invention may be embossed and/or tufted that creates a three-dimensional surface pattern that provides aesthetics and/or improved cleaning properties. In one example, the emboss area may be greater than 10% and/or greater than 12% and/or greater than 15% and/or greater than 20% of the surface area of at least one surface of the toilet tissue 10 and/or multi-ply toilet tissue 34 and/or web material, for example the textured first web material 30 and/or second web material 40.

In one example, the web material, for example the textured first web material 30 and/or the second web material 40 may be homogeneous or layered. If layered, they may comprise two or more and/or three or more and/or four or more and/or fiber or more layers.

In one example, at least one of the web material, for example textured first web material 30 and the second web material 40 comprise one or more layers of fibers 32, for example pulp fibers, such as wood pulp fibers, for example in the form of a layered wet-laid fibrous structure ply, such as a structured layered wet-laid fibrous structure ply. When the web material, for example the textured first web material 30 and/or second web material 40 comprise two or more layers of fibers 32, the fibers 32 of the layers may be different, for example one layer may comprise hardwood pulp fibers, such as eucalyptus fibers and/or trichome and/or rayon fibers, and the other layer may comprise softwood pulp fiber, such as NSK and/or SSK fibers.

In the case of a multi-ply toilet tissue 34 of the present invention, the web material, for example the textured first web material 30 (the non-surface material treated surface) may be associated with and/or bonded to the second web material 40 such as by adhesive, such as plybond glue (hot melt glue and/or cold glue), for example in a pattern for example a non-random repeating pattern, and/or in a stripe. In one example, the adhesive is registered with at least a portion of any emboss pattern present in the multi-ply toilet tissue 34.

It has unexpectedly been found that the dynamic surface of the toilet tissue and/or multi-ply toilet tissue of the present invention exhibits an Average Line Roughness Ra of greater than 50 μm and/or greater than 52 μm and/or greater than 54 μm and/or at least 56 μm as measured according to the MikroCAD Test Method described herein.

It has unexpectedly been found that the dynamic surface of the toilet tissue and/or multi-ply toilet tissue of the present invention exhibits an Average Line Roughness Rq of greater than 57 μm and/or greater than 60 μm and/or greater than 62 μm and/or at least 64 μm as measured according to the MikroCAD Test Method described herein.

It has unexpectedly been found that the dynamic surface of the toilet tissue and/or multi-ply toilet tissue of the present invention exhibits an Initial % Contact Area of greater than 50% and/or greater than 52% and/or greater than 54% and/or at least 56% and/or to less than 72% and/or to less than 70% and/or to less than 65% as measured according to the MikroCAD Test Method described herein.

It has unexpectedly been found that the dynamic surface of the toilet tissue and/or multi-ply toilet tissue of the present invention exhibits a Final % Contact Area of less than 80% and/or less than 75% and/or less than 72% and/or greater than 60% and/or greater than 65% as measured according to the MikroCAD Test Method described herein.

The toilet tissue and/or multi-ply toilet tissue of the present invention may exhibit a Basis Weight of at least about 20 gsm and/or at least about 25 gsm and/or at least about 30 gsm and/or at least about 35 gsm and/or at least about 40 gsm and/or at least about 45 gsm and/or at least about 50 gsm and/or at least about 55 gsm as measured according to the Basis Weight Test Method. The toilet tissue may exhibit a Basis Weight of at least about 10 gsm to about 120 gsm and/or at least about 20 gsm to about 80 gsm as measured according to the Basis Weight Test Method. The toilet tissue may exhibit a Basis Weight of at least about 10 gsm to about 60 gsm and/or at least 10 gsm to about 55 gsm and/or at least about 20 gsm to about 55 gsm and/or at least about 25 gsm to about 55 gsm as measured according to the Basis Weight Test Method.

The toilet tissue of the present invention may be flushable and/or dispersible and/or suitable for municipal wastewater and sewer systems and/or septic systems.

The toilet tissue of the present invention may exhibit a Total Wet Decay of greater than 30% and/or greater than 40% and/or greater than 50% and/or greater than 60% as measured according to the Wet Decay Test Method.

The toilet tissue of the present invention may exhibit an Initial Total Wet Tensile of greater than 30 g/in and/or greater than 40 g/in and/or greater than 50 g/in and/or greater than 60 g/in and/or less than about 78 g/cm (200 g/in) and/or less than about 59 g/cm (150 g/in) and/or less than about 39 g/cm (100 g/in) and/or less than about 29 g/cm (75 g/in) as measured according to the Wet Tensile Test Method. Such values are sometimes referred to as representing "temporary wet strength" in the toilet tissue of the present invention.

The toilet tissue of the present invention may exhibit a Total Dry Tensile of greater than 150 g/in and/or greater than about 200 g/in and/or greater than about 250 g/in and/or greater than about 350 g/in greater than about 500 g/in as measured according to the Dry Tensile Test Method. The toilet tissue may exhibit a Total Dry Tensile of from about 150 g/in to about 1000 g/in and/or from about 200 g/in to about 1000 g/in and/or from about 250 g/in to about 850 g/in and/or from about 350 g/in to about 850 g/in and/or from about 500 g/in to about 850 g/in as measured according to the Dry Tensile Test Method.

The toilet tissue of the present invention may exhibit a Flexural Rigidity of less than about 700 mg-cm and/or less than about 500 mg-cm and/or less than about 450 mg-cm and/or less than about 400 mg-cm as measured according to the Flexural Rigidity Test Method. The toilet tissue may exhibit a Flexural Rigidity of from about 500 mg-cm to about 100 mg-cm and/or from about 450 mg-cm to about 200 mg-cm and/or from about 400 mg-cm to about 300 mg-cm as measured according to the Flexural Rigidity Test Method.

The toilet tissue of the present invention may exhibit any combination of the properties described herein.

The toilet tissue of the present invention may comprise at least one fibrous structure ply comprising a structured fibrous structure ply, including structured fibrous structure plies formed on NTT, ETAD, and/or ATMOS papermaking lines, for example a through-air-dried fibrous structure ply, such as a creped through-air-dried fibrous structure ply or an uncreped through-air-dried fibrous structure ply.

The toilet tissue of the present invention may comprise at least one fibrous structure ply comprising a belt creped fibrous structure ply.

The toilet tissue of the present invention may comprise at least one fibrous structure ply comprising a fabric creped fibrous structure ply.

The toilet tissue of the present invention may comprise at least one fibrous structure ply comprising a conventional wet-pressed fibrous structure ply.

The toilet tissue of the present invention may comprise at least one fibrous structure ply comprising an embossed fibrous structure ply.

The toilet tissue of the present invention and/or at least one fibrous structure of the toilet tissue of the present invention may comprise at least one fibrous element, for example a fiber, such as a pulp fiber, which may be a wood pulp fiber.

In one example, the toilet tissue of the present invention may comprise a liquid composition.

In one example, the toilet tissue of the present invention and/or web materials present within the toilet tissue of the present invention may be non-lotioned and/or may not contain a post-applied surface chemistry.

The toilet tissue of the present invention and/or web materials present within the toilet tissue 5 of the present invention may be creped or uncreped.

The toilet tissue of the present invention and/or web materials present within the toilet tissue of the present invention may be uncreped. Further, even though an exterior surface, such as the dynamic surface of the toilet tissue of the present invention may not be creped (uncreped and/or non-undulating and/or not creped off a surface, such as a Yankee), one or more of the web materials making up the toilet tissue may be creped (undulating and/or creped off a surface, such as a Yankee).

Dynamic Surface Material

The dynamic surface of the toilet tissue comprises a surface material. The surface material comprises filaments, for example hydroxyl polymer filaments.

The toilet tissue of the present invention comprises a least one exterior surface, for example a consumer-contacting surface, that comes into contact with a consumer during use, such as during wiping. The consumer-contacting surface comprises and/or is formed by the dynamic surface of the present invention.

The filaments of the toilet tissue of the present invention, for example the filaments of the dynamic surface such as the filaments of the surface material may comprise a hydroxyl polymer, which may be a polysaccharide, such as a polysaccharide selected from the group consisting of: starch, starch derivatives, cellulose derivatives, hemicellulose, hemicellulose derivatives, and mixtures thereof, more specifically starch. In one example, the hydroxyl polymer may comprise polyvinyl alcohol. In still another example, the surface material may comprise both polyvinyl alcohol filaments and polysaccharide filaments, for example starch filaments. When present in the surface material, the polyvinyl alcohol filaments may form one layer of the surface material, for example the exterior layer that forms the exterior surface of the surface material and the toilet tissue and the polysaccharide filaments, for example starch filaments, may form another layer positioned between the layer of polyvinyl alcohol filaments and the surface of the textured first web material.

The filaments of the dynamic surface may be produced from a polymer melt composition, for example a hydroxyl polymer melt composition such as an aqueous hydroxyl polymer melt composition, comprising a hydroxyl polymer, such as an uncrosslinked starch for example a dent corn starch, an acid-thinned starch, a waxy starch, and/or a starch derivative such as an ethoxylated starch, and/or polyvinyl alcohol, and optionally a crosslinking system comprising a crosslinking agent, such as an imidazolidinone, and water. The hydroxyl polymer may exhibit a weight average molecular weight in the range of 50,000 g/mol to 40,000,000 g/mol as measured according to the Weight Average Molecular Weight Test Method described herein. In one example, the crosslinking agent comprises less than 2% and/or less than 1.8% and/or less than 1.5% and/or less than 1.25% and/or 0% and/or about 0.25% and/or about 0.50% by weight of a base, for example triethanolamine. In one example, the fibrous elements of the present invention comprise greater than 25% and/or greater than 40% and/or greater than 50% and/or greater than 60% and/or greater than 70% to about 95% and/or to about 90% and/or to about 80% by weight of the fibrous element of a hydroxyl polymer, such as starch, which may be in a crosslinked state. In one example, the fibrous element comprises an ethoxylated starch and an acid thinned starch, which may be in their crosslinked states.

The fibrous elements, for example filaments of the dynamic surface may exhibit an average diameter of less than 50 μm and/or less than 25 μm and/or less than 20 μm and/or less than 15 μm and/or less than 10 μm and/or greater than 1 μm and/or greater than 3 μm and/or from about 3-10 μm and/or from about 3-8 μm and/or from about 5-7 μm as measured according to the Average Diameter Test Method described herein. When present, the fibrous elements, for example polyvinyl alcohol filaments may exhibit smaller average diameters, for example from about 1 to about 3 μm, than the polysaccharide filaments.

The fibrous elements, for example filaments, such as the polysaccharide filaments, for example starch filaments may comprise a crosslinking agent, such as an imidazolidinone, such as dihydroxyethyleneurea (DHEU), which may be in its crosslinked state (crosslinking the hydroxyl polymers present in the filaments) at a level of from about 0.25% and/or from about 0.5% and/or from about 1% and/or from about 2% and/or from about 3% and/or to about 10% and/or to about 7% and/or to about 5.5% and/or to about 4.5% by weight of the fibrous element, for example filament and/or by weight of a surface material comprising the fibrous elements and/or by weight of a web material, for example second web material comprising the fibrous elements. In addition to the crosslinking agent, the fibrous elements, for example polysaccharide filaments may comprise a crosslinking facilitator that aids the crosslinking agent at a level of from 0% and/or from about 0.3% and/or from about 0.5% and/or to about 2% and/or to about 1.7% and/or to about 1.5% by weight of the fibrous element, for example filament and/or by weight of a surface material comprising the fibrous elements and/or by weight of a web material, for example second web material comprising the fibrous elements.

The fibrous elements, for example filaments, such as polysaccharide filaments may also comprise a surfactant, such as a sulfosuccinate surfactant. A non-limiting example of a suitable sulfosuccinate surfactant comprises Aerosol® AOT (a sodium dioctyl sulfosuccinate) and/or Aerosol® MA-80 (a sodium dihexyl sulfosuccinate), which are commercially available from Cytec. The surfactant, such as a sulfosuccinate surfactant, may be present at a level of from 0% and/or from about 0.1% and/or from about 0.3% to about 2% and/or to about 1.5% and/or to about 1.1% and/or to about 0.7% by weight of the fibrous element, for example filament and/or by weight of a surface material comprising the fibrous elements and/or by weight of a web material, for example second web material comprising the fibrous elements.

The fibrous elements, for example filaments, such as polysaccharide filaments may also comprise a weak acid, such as malic acid. The malic acid may be present at a level from 0% to 1% and/or from by weight of the fibrous element, for example filament and/or by weight of a surface material comprising the fibrous elements and/or by weight of a web material, for example second web material comprising the fibrous elements.

In addition to the crosslinking agent, the fibrous elements, for example filaments, such as the polysaccharide filaments may comprise a crosslinking facilitator such as ammonium salts of methanesulfonic acid, ethanesulfonic acid, propanesulfonic acid, isopropylsulfonic acid, butanesulfonic acid, isobutylsulfonic acid, sec-butylsulfonic acids, benzenesulfonic acid, toluenesulfonic acid, xylenesulfonic acid, cumenesulfonic acid, alkylbenzenesulfonic, alkylnaphthalenedisulfonic acids.

The fibrous elements, for example filaments, such as polysaccharide filaments may also comprise a polymer selected from the group consisting of: polyacrylamide and its derivatives; acrylamide-based copolymers, polyacrylic acid, polymethacrylic acid, and their esters; polyethyleneimine; copolymers made from mixtures of monomers of the aforementioned polymers; and mixtures thereof at a level of from 0% and/or from about 0.01% and/or from about 0.05% and/or to about 0.5% and/or to about 0.3% and/or to about 0.2% by weight of the fibrous element, for example filament and/or by weight of a surface material comprising the fibrous elements and/or by weight of a web material, for example second web material comprising the fibrous elements. Such polymers may exhibit a weight average molecular weight of greater than 500,000 g/mol. In one example, the fibrous element comprises polyacrylamide.

The fibrous elements, for example filaments may also comprise various other ingredients such as propylene glycol, sorbitol, glycerin, and mixtures thereof.

One or more hueing agents, such as Violet CT may also be present in the polymer melt composition and/or fibrous elements, for example filaments formed therefrom.

In one example, the fibrous elements, for example filaments of the present invention comprise a fibrous element-forming polymer, such as a hydroxyl polymer, for example a crosslinked hydroxyl polymer. In one example, the fibrous elements, for example filaments may comprise two or more fibrous element-forming polymers, such as two or more hydroxyl polymers. In another example, the fibrous elements, for example filaments may comprise two or more fibrous element-forming polymers, such as two or more hydroxyl polymers, at least one of which is starch and/or a starch derivative. In still another example, the fibrous elements, for example filaments of the present invention may comprise two or more fibrous element-forming polymers at least one of which is a hydroxyl polymer and at least one of which is a non-hydroxyl polymer.

In yet another example, the fibrous elements, for example filaments of the present invention may comprise two or more non-hydroxyl polymers. In one example, at least one of the non-hydroxyl polymers exhibits a weight average molecular weight of greater than 1,400,000 g/mol and/or is present in the fibrous elements at a concentration greater than its entanglement concentration (Ce) and/or exhibits a polydispersity of greater than 1.32. In still another example, at least one of the non-hydroxyl polymers comprises an acrylamide-based copolymer.

As mentioned, the fibrous elements, for example filaments of the present invention may be produced from spinning a polymer melt composition. The polymer melt compositions may have a temperature of from about 50° C. to about 100° C. and/or from about 65° C. to about 95° C. and/or from about 70° C. to about 90° C. when spinning fibrous elements, for example filaments from polymer melt compositions that produce the fibrous elements, for example filaments of the present invention.

The fibrous elements, for example filaments, such as polyvinyl alcohol filaments of the present invention are attenuated during the spinning process to average fiber diameters of less than 2 μm and/or less than 1.5 μm and/or less than 1 μm and/or less than 900 nm and/or less than 800 nm and greater than 100 nm and/or greater than 200 nm average fiber diameter fibrous elements (filaments and/or fibers) as measured according to the Surface Average Fiber Diameter Test Method described herein, with high humidity air streams (air jets), for example saturated air stream(s). In one example, the high humidity air streams are provided at a flowrate of less than 1.5" and/or less than 1.25" and/or less than 1.0" water column, which results in the fibrous elements bonding more upon laydown and forming of a scrim layer of fibrous elements on the fibrous structure and/or web material as at least part of the surface material. In one example, this bonding more upon laydown results in the toilet tissue exhibiting a non-clingy, non-tacky surface.

In one example, the polymer melt composition of the present invention may comprise from about 30% and/or from about 40% and/or from about 45% and/or from about 50% to about 75% and/or to about 80% and/or to about 85% and/or to about 90% and/or to about 95% and/or to about 99.5% by weight of the polymer melt composition of a fibrous element-forming polymer, such as a hydroxyl polymer. The fibrous element-forming polymer, such as a hydroxyl polymer, may have a weight average molecular weight greater than 100,000 g/mol.

In one example, the fibrous elements, for example filaments of the present invention produced via a polymer processing operation may be cured at a curing temperature of from about 110° C. to about 260° C. and/or from about 110° C. to about 230° C. and/or from about 120° C. to about 200° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the fibrous elements, for example filaments may also be cured at room temperature for days, either after curing at above room temperature or instead of curing at above room temperature.

The fibrous elements, for example filaments of the present invention may include melt spun fibrous elements, for example filaments and/or spunbond fibrous elements, for example filaments, hollow filaments, shaped filaments, such as multi-lobal filaments, and multicomponent filaments, especially bicomponent filaments. The multicomponent filaments, especially bicomponent filaments, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The filaments of the present invention may have different geometries that include round, elliptical, star shaped, rectangular, and other various eccentricities.

Figure 6:
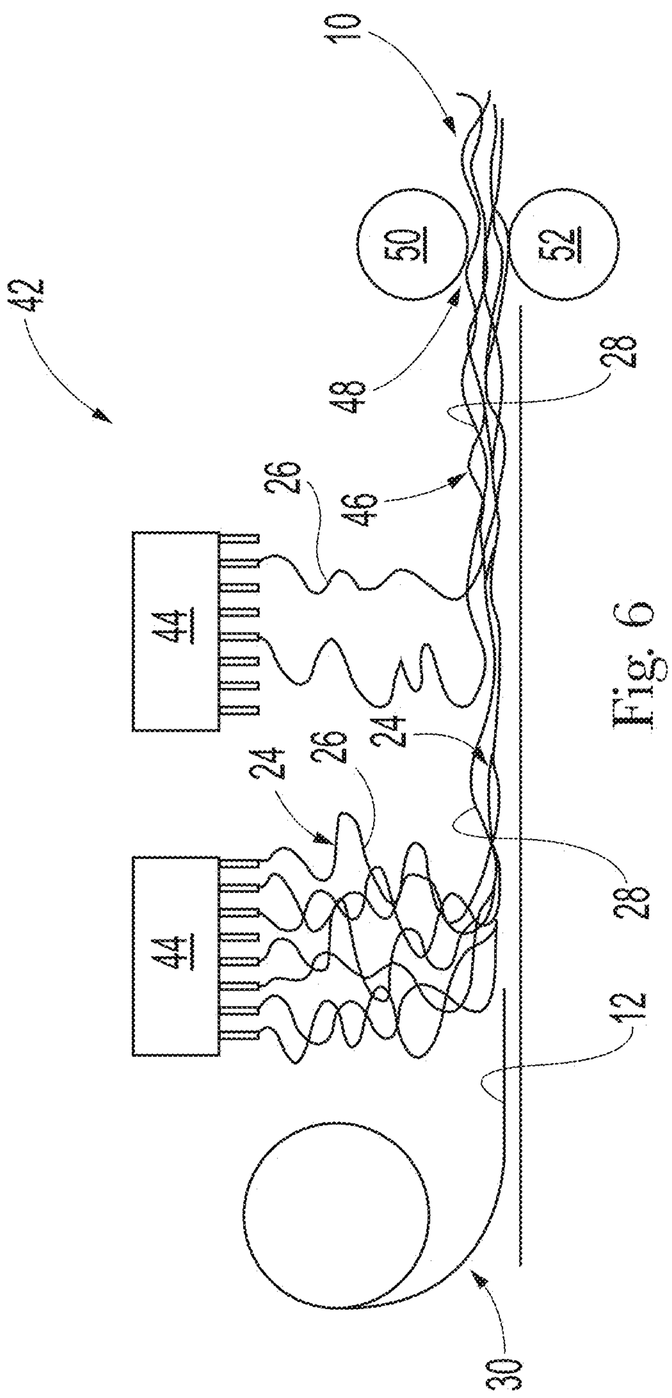
FIG. 6 is a schematic representation of an example of a method for making a toilet tissue according to the present invention.

The dynamic surface of the present invention may be made by the fibrous structure making process 42 shown in FIG. 6 by providing a web material, for example a textured first web material 30 comprising a plurality of fibrous elements, for example fibers 32, and depositing a surface material 24 comprising a plurality of fibrous elements, for example filaments 26, for example hydroxyl polymer filaments, such as polysaccharide filaments for example starch filaments, from one or more and/or two or more filament sources 44, such as a die, for example a meltblow die, such as a multi-row capillary die to form a dynamic surface 28, wherein the surface material 24 in this case comprises the inter-entangled filaments 26 that have been deposited onto at least one surface 12 of the textured first web material 30 to form a toilet tissue of the present invention. The dynamic surface 28 may comprise an additional surface material 24, additional fibrous elements, for example additional filaments 26, for example polyvinyl alcohol filaments, by depositing a plurality of fibrous elements, for example filaments 26, for example polyvinyl alcohol filaments onto the previously deposited surface material 24 comprising filaments 26, for example starch filaments. The additional fibrous elements, for example filaments 26 may be applied from a filament source 44 such that the second set of fibrous elements, for example filaments 26, for example polyvinyl alcohol filaments for the exterior surface 46 of the toilet tissue and the dynamic surface 28.

This fibrous structure making process 42 may further comprise the step of associating the filaments 26 from the two or more filament sources 40 such as by bonding, for example creating thermal bonds by passing the surface material 24 through a nip 48 formed by a patterned thermal bond roll 50 and a flat roll 52. The fibrous structure making process 42 may optionally comprise the step of winding the toilet tissue 10 into a roll, such as a parent roll for unwinding in a converting operation to cut the roll into consumer-useable sized toilet tissue rolls and/or emboss the toilet tissue 10 and/or perforate the toilet tissue 10 into consumer-useable sized sheets. In addition, the roll of toilet tissue 10, such as when in the form of a parent roll, may be combined with a second web material (not shown), the same or different as the textured first web material 30, to make a multi-ply toilet tissue, for example a two-ply toilet tissue according to the present invention, an example of which is shown in FIG. 5D. In addition, the method may further comprises the steps of perforating the fibrous structure, for example toilet tissue, the step of rolling the fibrous structure, for example toilet tissue, into a fibrous structure roll (toilet tissue roll), and/or the step of packaging one or more of the fibrous structure rolls (toilet tissue rolls) into a package.

Web Material

The web material, for example the first web material, for example the textured first web material, and/or the second web material and/or additional web material, such as a third web material, may comprise a plurality of fibrous elements, for example a plurality of fibers, such as greater than 80% and/or greater than 90% and/or greater than 95% and/or greater than 98% and/or greater than 99% and/or 100% by weight of the web material of fibers.

The web material may comprise a plurality of naturally-occurring fibers, for example pulp fibers, such as wood pulp fibers (hardwood and/or softwood pulp fibers). In another example, the web material comprises a plurality of non-naturally occurring fibers (synthetic fibers), for example staple fibers, such as rayon, lyocell, nylon, polyester fibers, polycaprolactone fibers, polylactic acid fibers, polyhydroxy-alkanoate fibers, and mixtures thereof. In another example, the web material comprises a mixture of naturally-occurring fibers, for example pulp fibers, such as wood pulp fibers (hardwood and/or softwood pulp fibers) and a plurality of non-naturally occurring fibers (synthetic fibers), for example staple fibers, such as rayon, lyocell, nylon, polyester fibers, polycaprolactone fibers, polylactic acid fibers, polyhydroxy-alkanoate fibers, and mixtures thereof.

The web material may comprise a wet laid fibrous structure ply, such as a through-air-dried fibrous structure ply, for example an uncreped, through-air-dried fibrous structure ply and/or a creped, through-air-dried fibrous structure ply.

The web material, for example a wet laid fibrous structure ply may exhibit substantially uniform density.

The web material, for example a wet laid fibrous structure ply may exhibit differential density.

The web material, for example a wet laid fibrous structure ply may comprise a surface pattern.

The web material, for example a wet laid fibrous structure ply may comprise a conventional wet-pressed fibrous structure ply. The wet laid fibrous structure ply may comprise a fabric-creped fibrous structure ply. The wet laid fibrous structure ply may comprise a belt-creped fibrous structure ply.

The web material may comprise an air laid fibrous structure ply.

The web materials of the present invention may comprise a surface softening agent or be void of a surface softening agent, such as silicones, quaternary ammonium compounds, lotions, and mixtures thereof. The toilet tissue and/or web material of the toilet tissue may comprise a non-lotioned web material, for example the first web material.

The web materials of the present invention may comprise trichome fibers or may be void of trichome fibers.

Patterned Molding Members

The web materials of the present invention may be formed on patterned molding members, for example coarse through-air-drying fabrics, such as UCTAD fabrics, patterned resin-containing molding members, patterned rollers, patterned belt-creping molding members, patterned fabric-creping molding members, other patterned papermaking clothing, that result in the web materials, for example structured web materials, such as structure fibrous structures of the present invention. The pattern molding member may comprise a non-random repeating pattern. The pattern molding member may comprise a resinous pattern.

The web material may comprise a textured surface, which results in a textured fibrous structure, for example textured toilet tissue and/or textured multi-ply toilet tissue of the present invention. The web material may comprise a surface comprising a three-dimensional (3D) pattern, for example a 3D pattern imparted to the web material by a patterned molding member. Non-limiting examples of suitable patterned molding members include patterned felts, patterned forming wires, patterned rolls, patterned fabrics, and patterned belts utilized in conventional wet-pressed papermaking processes, air-laid papermaking processes, and/or wet-laid papermaking processes that produce 3D patterned toilet tissue and/or 3D patterned fibrous structure plies employed in toilet tissue. Other non-limiting examples of such patterned molding members include through-air-drying fabrics and through-air-drying belts utilized in through-air-drying papermaking processes that produce through-air-dried fibrous structures, for example 3D patterned through-air dried fibrous structures, and/or through-air-dried toilet tissue comprising the web material, for example the first web material.

The web material may comprise a 3D patterned web material having a surface comprising a 3D pattern.

The web material may be made by any suitable method, such as wet-laid, air laid, coform, hydroentangling, carding, meltblowing, spunbonding, and mixtures thereof. In one example the method for making the web material of the present invention comprises the step of depositing a plurality of fibers onto a collection device, such as a 3D patterned molding member such that a web material is formed.

A "reinforcing element" may be a desirable (but not necessary) element in some examples of the molding member, serving primarily to provide or facilitate integrity, stability, and durability of the molding member comprising, for example, a resinous material. The reinforcing element can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

Figure 7:
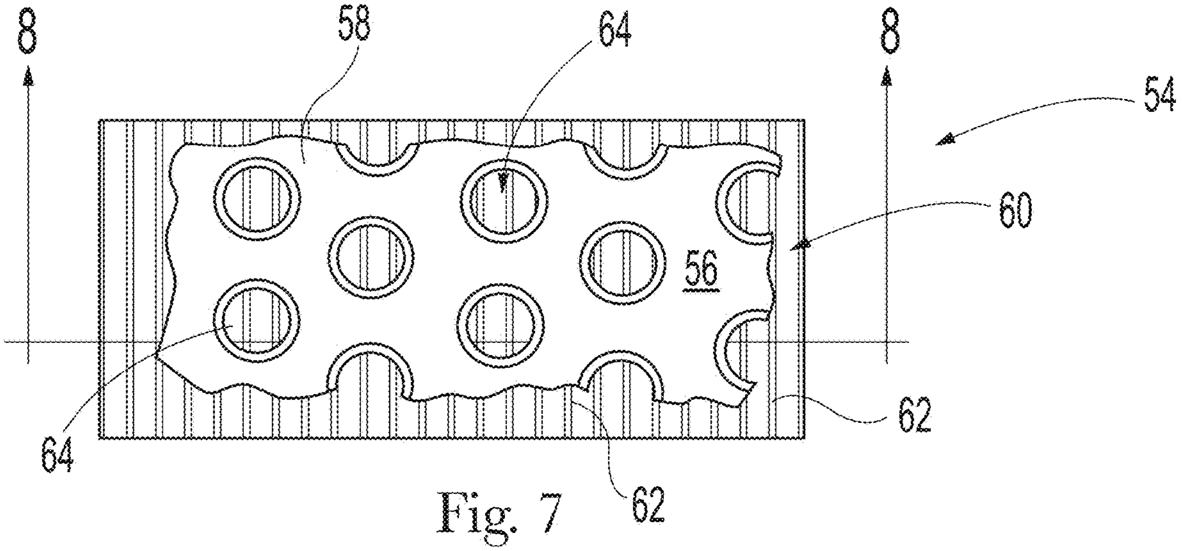
FIG. 7 is a top plan view of an example of a patterned molding member according to the present invention.
Figure 8:
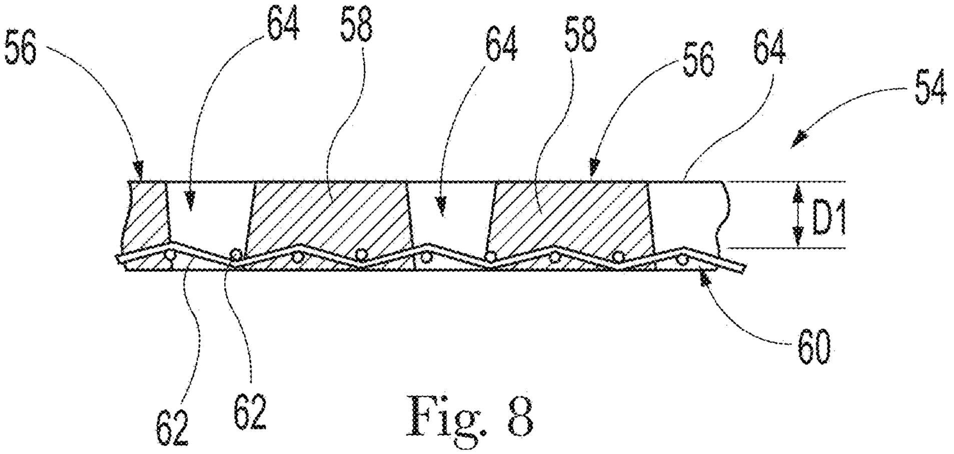
FIG. 8 is a cross-section view of the patterned molding member of FIG. 7 taken along line 8-8.

As shown in FIGS. 7 and 8, a non-limiting example of a patterned molding member 54, in this case a through-air-drying belt, suitable for use in the present invention comprises a continuous network knuckle 56 formed by a resin 58 arranged in a pattern, for example a non-random, repeating pattern supported on a support fabric 60 comprising support fabric filaments 62. The continuous network knuckle 56 of resin 58 comprises deflection conduits 64 into which portions of a web material being made on the patterned molding member 54 deflect thus imparting the pattern of the patterned molding member 54 to the web material resulting in a structured web material and/or structure fibrous structure for use in the toilet tissue of the present invention. The deflected portions of the web material result in pillows, for example lower density regions compared to other parts of the web material, within the structured web material and/or structured fibrous structure and/or structured fibrous structure ply. The continuous network knuckle 56, in this case, and other forms and/or shapes, discrete and/or continuous knuckles impart knuckles, for example higher density regions compared to other parts of the web material, such as pillows.

As shown in FIG. 8, the resin 58 may be present on the support fabric 60 at a height DI of greater than 5.0 mils and/or greater than 7.0 mils and/or greater than 8.0 mils and/or greater than 10.0 mils and/or greater than 12.0 mils and/or greater than 13.0 mils and/or greater than 15.0 mils and/or greater than 17.0 mils and/or greater than 20.0 mils in order to define deflection conduits 60 that impart one or more pillows within a structured web material that exhibit similar heights, which when incorporated into the toilet tissue of the present invention results in the toilet tissue exhibiting the thick, absorbent, and/or flexible properties of the present invention.

Non-Limiting Examples of Making Web Material

The web materials of the present invention may be made by any suitable papermaking process, such as conventional wet press papermaking process, through-air-dried papermaking process, belt-creped papermaking process, fabric-creped papermaking process, creped papermaking process, uncreped papermaking process, coform process, and air-laid process, so long as the web material comprises a plurality of fibrous elements, for example a plurality of fibers. In one example, the web material is made on a molding member of the present invention is used to make the web material of the present invention. The method may be a web material making process that uses a cylindrical dryer such as a Yankee (a Yankee-process) or it may be a Yankeeless process as is used to make substantially uniform density and/or uncreped web materials (fibrous structures). Alternatively, the web materials may be made by an air-laid process and/or meltblown and/or spunbond processes and any combinations thereof so long as the web materials of the present invention are made thereby.

Figure 9:
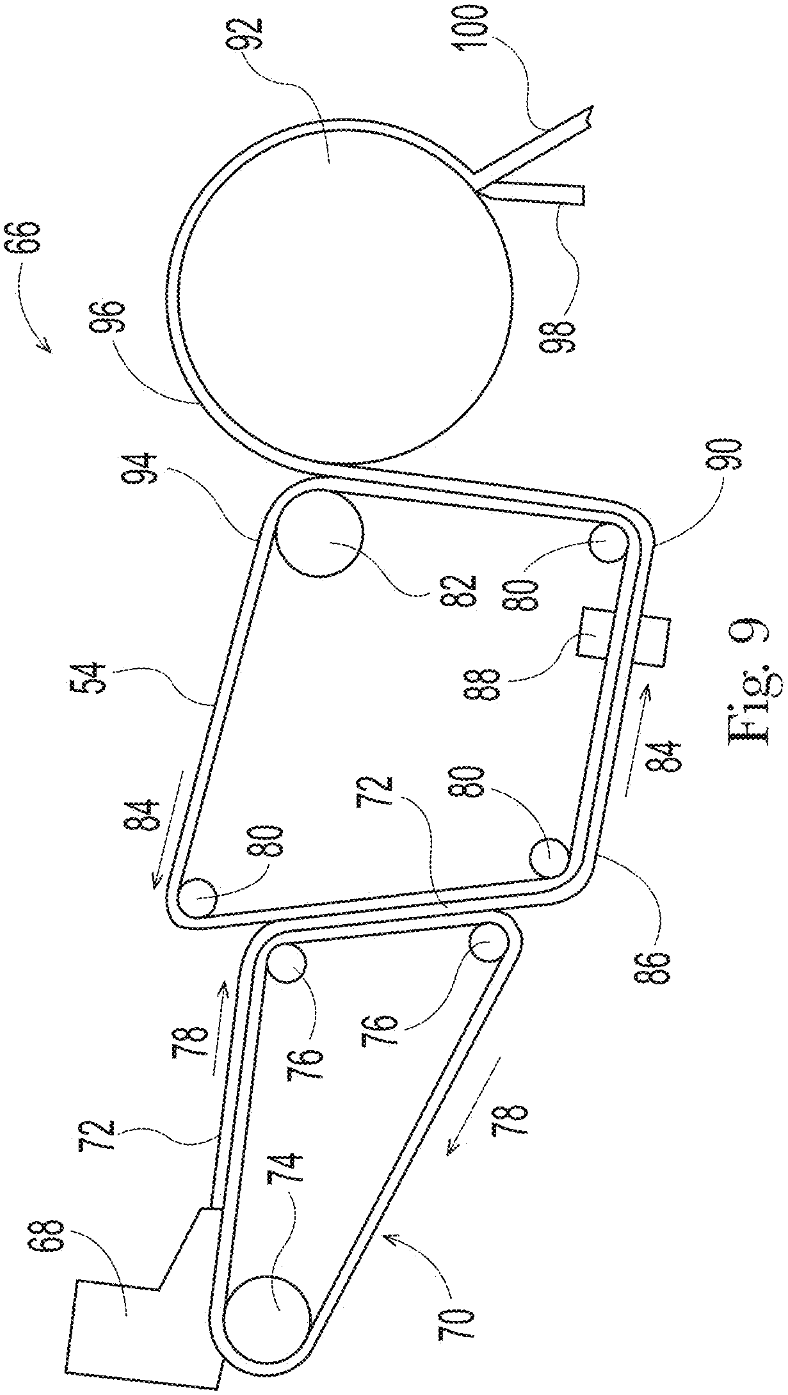
FIG. 9 is a schematic representation of an example of a method for making a web material according to the present invention.

As shown in FIG. 9, one example of a process and equipment, represented as 66 for making a web material, for example a structured web material and/or textured web material according to the present invention comprises supplying an aqueous dispersion of fibers (a fibrous furnish or fiber slurry) to a headbox 68 which can be of any convenient design. From headbox 68 the aqueous dispersion of fibers is delivered to a first foraminous member 70 which is typically a Fourdrinier wire, to produce an embryonic fibrous structure 72.

The first foraminous member 70 may be supported by a breast roll 74 and a plurality of return rolls 76 of which only two are shown. The first foraminous member 70 can be propelled in the direction indicated by directional arrow 78 by a drive means, not shown. Optional auxiliary units and/or devices commonly associated fibrous structure making machines and with the first foraminous member 70, but not shown, include forming boards, hydrofoils, vacuum boxes, tension rolls, support rolls, wire cleaning showers, and the like.

After the aqueous dispersion of fibers is deposited onto the first foraminous member 70, embryonic fibrous structure (embryonic web material) 72 is formed, typically by the removal of a portion of the aqueous dispersing medium by techniques well known to those skilled in the art. Vacuum boxes, forming boards, hydrofoils, and the like are useful in effecting water removal. The embryonic fibrous structure 72 may travel with the first foraminous member 70 about return roll 76 and is brought into contact with a patterned molding member 54, such as a 3D patterned through-air-drying belt as shown in FIGS. 7 and 8. While in contact with the patterned molding member 54, the embryonic fibrous structure 72 will be deflected, rearranged, and/or further dewatered.

The patterned molding member 54 may be in the form of an endless belt. In this simplified representation, the patterned molding member 54 passes around and about patterned molding member return rolls 80 and impression nip roll 82 and may travel in the direction indicated by directional arrow 84. Associated with patterned molding member 54, but not shown, may be various support rolls, other return rolls, cleaning means, drive means, and the like well-known to those skilled in the art that may be commonly used in fibrous structure making machines.

After the embryonic fibrous structure 72 has been associated with the patterned molding member 54, fibers within the embryonic fibrous structure 72 are deflected into pillows and/or pillow network (deflection conduits 64 shown in FIGS. 7 and 8) present in the patterned molding member 54. In one example of this process step, there is essentially no water removal from the embryonic fibrous structure 72 through the deflection conduits 64 after the embryonic fibrous structure 72 has been associated with the patterned molding member 54 but prior to the deflecting of the fibers (portions of the web material) into the deflection conduits 64. Further water removal from the embryonic fibrous structure 72 can occur during and/or after the time the fibers are being deflected into the deflection conduits 64. Water removal from the embryonic fibrous structure 72 may continue until the consistency of the embryonic fibrous structure 72 associated with patterned molding member 54 is increased to from about 25% to about 35%. Once this consistency of the embryonic fibrous structure 72 is achieved, then the embryonic fibrous structure 72 can be referred to as an intermediate fibrous structure (intermediate web material) 86. During the process of forming the embryonic fibrous structure 72, sufficient water may be removed, such as by a noncompressive process, from the embryonic fibrous structure 72 before it becomes associated with the patterned molding member 54 so that the consistency of the embryonic fibrous structure 72 may be from about 10% to about 30%.

While applicants decline to be bound by any particular theory of operation, it appears that the deflection of the fibers in the embryonic fibrous structure and water removal from the embryonic fibrous structure begin essentially simultaneously. Embodiments can, however, be envisioned wherein deflection and water removal are sequential operations. Under the influence of the applied differential fluid pressure, for example, the fibers may be deflected into the deflection conduit with an attendant rearrangement of the fibers. Water removal may occur with a continued rearrangement of fibers. Deflection of the fibers, and of the embryonic fibrous structure, may cause an apparent increase in surface area of the embryonic fibrous structure. Further, the rearrangement of fibers may appear to cause a rearrangement in the spaces or capillaries existing between and/or among fibers.

It is believed that the rearrangement of the fibers can take one of two modes dependent on a number of factors such as, for example, fiber length. The free ends of longer fibers can be merely bent in the space defined by the deflection conduit while the opposite ends are restrained in the region of the ridges. Shorter fibers, on the other hand, can actually be transported from the region of the ridges into the deflection conduit (The fibers in the deflection conduits will also be rearranged relative to one another). Naturally, it is possible for both modes of rearrangement to occur simultaneously.

As noted, water removal occurs both during and after deflection; this water removal may result in a decrease in fiber mobility in the embryonic fibrous structure. This decrease in fiber mobility may tend to fix and/or freeze the fibers in place after they have been deflected and rearranged. Of course, the drying of the fibrous structure in a later step in the process of this invention serves to more firmly fix and/or freeze the fibers in position.

In addition to or an alternative to the above-described water removal and deflection method to create texture in a web material, for example a textured first web material for use in the present invention, creping, microcreping, printing, rush transfer, wet transfer, fabric creping, belt creping or other similar processes that may also impart a texture and/or decorative pattern to a web material, for example a textured first web material, a fibrous structure, and/or a toilet tissue may be used.

Any convenient means conventionally known in the papermaking art can be used to dry the intermediate fibrous structure 86. Examples of such suitable drying process include subjecting the intermediate fibrous structure 86 to conventional and/or flow-through dryers and/or Yankee dryers. In addition, other drying processes such as ultrasonics, capillary dewatering, IR drying, impingement air, and heated surfaces may be utilized.

In one example of a drying process, the intermediate fibrous structure 86 in association with the patterned molding member 54 passes around the patterned molding member return roll 80 and travels in the direction indicated by directional arrow 84. The intermediate fibrous structure 86 may first pass through an optional predryer 88. This predryer 88 can be a conventional flow-through dryer (hot air dryer) well known to those skilled in the art. Optionally, the predryer 88 can be a so-called capillary dewatering apparatus. In such an apparatus, the intermediate fibrous structure 86 passes over a sector of a cylinder having preferential-capillary-size pores through its cylindrical-shaped porous cover. Optionally, the predryer 88 can be a combination capillary dewatering apparatus and flow-through dryer. The quantity of water removed in the predryer 88 may be controlled so that a predried fibrous structure 90 exiting the predryer 88 has a consistency of from about 30% to about 98%. The predried fibrous structure 90, which may still be associated with patterned molding member 54, may pass around another patterned molding member return roll 80 as it travels to an impression nip roll 82. As the predried fibrous structure 90 passes through the nip formed between impression nip roll 82 and a surface of a Yankee dryer 92, the pattern formed by the top surface 94 of the patterned molding member 54 is impressed into the predried fibrous structure 90 to form a structured fibrous structure (structured web material), for example a 3D patterned fibrous structure (3D patterned web material) 96. The structured fibrous structure 96, for example textured web material, can then be adhered to the surface of the Yankee dryer 92 where it can be dried to a consistency of at least about 95%.

The structured fibrous structure 96 can then be foreshortened by creping the structured fibrous structure 96 with a creping blade 98 to remove the structured fibrous structure 96 from the surface of the Yankee dryer 92 resulting in the production of a structured creped fibrous structure (structured creped web material or textured creped web material) 100 in accordance with the present invention. As used herein, foreshortening refers to the reduction in length of a dry (having a consistency of at least about 90% and/or at least about 95%) fibrous structure which occurs when energy is applied to the dry fibrous structure in such a way that the length of the fibrous structure is reduced and the fibers in the fibrous structure are rearranged with an accompanying disruption of fiber-fiber bonds. Foreshortening can be accomplished in any of several well-known ways. One common method of foreshortening is creping. The structured creped fibrous structure 100 may be used as is as a web material, for example a textured web material, in the toilet tissue of the present invention or it may be subjected to post processing steps such as calendaring, tuft generating operations, and/or embossing and/or converting to form a structured fibrous structure ply and then used in the toilet tissue of the present invention.

Non-Limiting Examples of Toilet Tissues

Comparative Example 1—Comparative Example of a Multi-Ply Toilet Tissue

A comparative multi-ply toilet tissue is prepared as follows. In a twin-screw extruder with eight temperature zones, Amioca starch is mixed with Aerosol OT-70 surfactant, malic acid and water in Zone 1. This mixture is then conveyed down the barrel through Zones 2 through 8 and cooked into a melt-processed hydroxyl polymer composition. The composition in the extruder is 35% water where the make-up of solids is 99% Amioca, 0.5% Aerosol OT-70, 0.7% ammonium methansulfonate, 0.1% malic acid. The extruder barrel temperature setpoints for each Zone are shown below.

| Zone | 1 | 2 | 3 | 4 | 5 | 6 | 7 | 8 | 8-0 die block |
|---|---|---|---|---|---|---|---|---|---|
| Temperature (° F.) | 60 | 300 | 355 | 370 | 370 | 365 | 365 | 365 | 350 |

The temperature of the melt exiting extruder is between 32° and 350° F. From the extruder, the melt is fed to directly to a second twin-screw extruder which serves to cool the melt by venting a stream to atmospheric pressure. The second extruder also serves as a location for additives to the hydroxyl polymer melt. Particularly, a stream of 2.2 wt % Hyperfloc NF301 polyacrylamide is introduced at a level of 0.1% and a stream of 35 wt % ammonium methanesulfonate is introduced at a level of 1.0%. The material that is not vented is conveyed down the extruder to a second melt pump. From here, the hydroxyl polymer melt is delivered to a series of static mixers where a cross-linker is added. The melt composition at this point in the process is 60-65% total solids. On a solids basis the melt is comprised of 92.4% Amioca starch, 5.5% cross-linker, 1.0% ammonium methanesulfonate, 1.0% surfactant, 0.1% Hyperfloc NF301, and 0.1% malic acid. From the static mixers the composition is delivered to a melt blowing spinneret via a melt pump.

A plurality of starch filaments having an of greater than 2 μm; namely, about 4-7 μm is attenuated with a saturated air stream to form a layer of filaments that are inter-entangled with one another to form a starch filament surface material at a basis weight of 4.8 $g/m^2$ and is formed on top of a relatively smooth, flat web material, for example a wet-laid pulp web material having a basis weight of 21-26 $g/m^2$. The wet-laid pulp web material is relatively smooth, flat, and soft-to-the-touch like the web material is patterned/molded and consists of a continuous, high density region (a knuckle) and discontinuous, discrete low density regions (pillows). The wet-laid pulp web material is formed on a belt with pillow dimensions of approximately 31.1 mils (minimum dimension D of pillow)×43.3 mils, and knuckle distances between pillows of 13.1 and 30.9 mils in the machine direction and cross-machine direction respectively, and knuckle thickness of 12.5 mils.

An additional layer of filaments, for example polyvinyl alcohol filaments, such as a polyvinyl alcohol filament scrim, having an average fiber diameter of less than 2 μm and/or less than 1.5 μm and/or less than 1 μm and/or less than 900 nm and/or less than 800 nm and greater than 100 nm and/or greater than 200 nm (polyvinyl alcohol filaments) as measured according to the Surface Average Fiber Diameter Test Method described herein is deposited on the starch filament-surface material already present on the wet-laid pulp web material to make a layered surface material. The layered fibrous structure is prepared by forming a second (scrim) layer of polyvinyl alcohol onto the top of the starch filament/wet-laid pulp layered fibrous structure.

The polyvinyl alcohol filaments are prepared by the following procedure. Poval 10-98 polyvinyl alcohol (98% hydrolysis Kuraray) having a weight average molecular weight of 50,000 g/mol and water are added into a scraped, wall pressure vessel equipped with an overhead agitator to target a 35 wt % polyvinyl alcohol solution ("polymer melt composition"). The 35 wt % polyvinyl alcohol solution is cooked under pressure at 240° F. for 4 hours under 20 psi until the resulting melt is homogenous and transparent. Entrained air is removed from the polyvinyl alcohol solution by slowly venting the tank to atmosphere. The Poval 10-98 polyvinyl alcohol solution is then pumped via a gear pump to a static mixer where a cross-linker and cross-linker activator are added. From the static mixer the polyvinyl alcohol solution is delivered to a meltblowing spinneret.

A plurality of polyvinyl alcohol filaments is attenuated with a saturated air stream at an air pressure of 1.0 psig and dried with 450° F. air at a flowrate of 2.0" water column to form a layer of polyvinyl alcohol filaments of 0.25 $g/m^2$ that are deposited as inter-entangled filaments on top of a starch filament/wet-laid pulp web material structure previously formed to make a toilet tissue, for example a single-ply toilet tissue. The resulting toilet tissue from top to bottom is 0.25 $g/m^2$ polyvinyl alcohol filaments/4.8 $g/m^2$ starch filaments/21-26 $g/m^2$ wet-laid pulp web material. The resulting toilet tissue is then subjected to a thermal bonding process wherein thermal bond sites are formed between the polyvinyl alcohol filament layer, the starch filament layer, and the wet-laid pulp web material. The thermal bond roll has a diamond shaped pattern with 13% bond area, and results in a 0.075 in. distance between bond sites in the toilet tissue. The thermally bonded toilet tissue is then transferred to a curing oven where the toilet tissue temperature is increased to 200° C. for enough time to activate the cross-linker in the starch and polyvinyl alcohol filaments. The cured toilet tissue is then wound about a core to produce a parent roll of the toilet tissue. The hydroxyl polymer filaments (starch and polyvinyl alcohol filaments) create a smooth, flat, soft-to-the-touch surface on the relatively smooth, flat wet-laid pulp web material. This parent roll is then combined with two wet-laid web material parent rolls using glue to form a 3-ply toilet tissue.

This 3-ply toilet tissue's surface is not a dynamic surface of the present invention because the surface material does not deflect into sufficient texture on the surface of the wet-laid pulp web material, but is smooth, flat, and soft-to-the-touch and exhibits an Average Line Roughness Ra of 49.8 μm, an Average Line Roughness Rq of 56.7 μm, an Initial % Contact Area of 33%, and a Final % Contact Area of 82% as measured according to the MikroCAD Test Method described herein.

Comparative Example 2—Comparative Example of a Multi-Ply Toilet Tissue

A comparative multi-ply toilet tissue is prepared according to Example 1 except the hydroxyl polymer filaments (the starch and polyvinyl alcohol filaments of the surface material) are spun onto a web material, for example a wet-laid textured web material, such as a wet-laid textured pulp web material having a basis weight of 21-26 $g/m^2$. The wet-laid textured web material has more texture than Example I due to higher degree of molding in the paper-making process (web material making process). The surface of the wet-laid textured web material is composed of machine-direction oriented semi-continuous low-density pillow regions and machine direction semi-continuous high-density knuckle regions as shown in FIGS. 4A and 4B. The wet-laid textured web material is formed on a belt with 20 mil knuckle thickness and 30 mil pillow width dimensions (minimum dimension D of the pillows). The resulting toilet tissue from top to bottom is 0.25 $g/m^2$ polyvinyl alcohol filaments/4.8 $g/m^2$ starch filaments/21-26 $g/m^2$ wet-laid textured web material. The resulting toilet tissue is then subjected to a thermal bonding process wherein thermal bond sites are formed between the polyvinyl alcohol filament layer, the starch filament layer, and the wet-laid textured web material. The thermal bond roll has a diamond shaped pattern with 13% bond area, and results in a 0.075 in. distance between bond sites in the wet-laid textured web material. The thermally bonded toilet tissue is then transferred to a curing oven where the toilet tissue temperature is increased to 200° C. for enough time to activate the cross-linker in the starch and polyvinyl alcohol filaments. The cured toilet tissue is then wound about a core to produce a parent roll. The continuous hydroxyl polymer filaments collapse into the low-density regions of the underlying wet-laid textured web material as illustrated in FIGS. 4A and 4B and therefore do not span or bridge the low-density pillow regions. Two of the parent rolls made as described are then combined using glue to form a 2-ply toilet tissue.

This 2-ply toilet tissue exhibits a textured top surface that does not support the hydroxyl polymer filament surface material as shown by the collapse of the surface material into the low-density pillow regions and thus does not exhibit a smooth, flat, soft-to-the-touch surface. Therefore, the surface of this 2-ply toilet tissue is not a dynamic surface according to the present invention. This 2-ply toilet tissue exhibits an Average Line Roughness Ra of 48.1 μm, an Average Line Roughness Rq of 86.4 μm, an Initial % Contact Area of 49%, and a Final % Contact Area of 72% as measured according to the MikroCAD Test Method described herein.

Inventive Example 1—Inventive Example of Multi-ply Toilet Tissue

An inventive multi-ply toilet tissue is prepared according to Example 1 except the hydroxyl polymer filaments (the starch and polyvinyl alcohol filaments of the surface material) are spun onto a textured web material, for example a wet-laid textured web material having a basis weight of 21-26 g/m$^2$. The textured web material has more texture than Example 1 due to higher degree of molding in the papermaking process (web material making process). The textured web material is composed of discontinuous/discrete low-density pillow regions and a continuous high-density knuckle region with 15 mil knuckle thickness and 60 mil pillow circle radius dimensions (minimum dimension D of the pillows) similar to the textured web material shown in FIGS. 5A-5C. The resulting toilet tissue from top to bottom is 0.25 g/m$^2$ polyvinyl alcohol filaments/4.8 g/m$^2$ starch filaments/21-26 g/m$^2$ textured web material. The resulting toilet tissue is then subjected to a thermal bonding process wherein thermal bond sites are formed between the polyvinyl alcohol filament layer, the starch filament layer, and the textured web material. The thermally bonded web is then transferred to a curing oven where the toilet tissue temperature is increased to 200° C. for enough time to activate the cross-linker in the starch and polyvinyl alcohol filaments. The cured toilet tissue is then wound about a core to produce a parent roll. The continuous hydroxyl polymer filaments are supported by the continuous, high density knuckle regions and span/bridge the low density discontinuous/discrete pillow regions of the underlying textured web material. This creates a dynamic surface on the toilet tissue; namely, a flat, smooth, soft-to-the-touch surface when no pressure is applied to the toilet tissue, for example prior to wiping, and a textured surface able to provide good cleaning and bowel movement removal when pressure is applied, for example during wiping because the surface material comprising the hydroxyl polymer filaments deforms into the pillow regions of the textured web material upon application of pressure during wiping. The toilet tissue is wound into a roll, such as a parent roll, and then is combined using hot melt adhesive with another web material, to form a 2-ply toilet tissue.

This 2-ply toilet tissue comprises a dynamic surface according to the present invention. The dynamic surface of this 2-ply toilet tissue comprises a textured surface from the textured web material that anchors the surface material (hydroxyl polymer filaments) via high density knuckle regions which results in an effectively smooth, flat, soft-to-the-touch surface due to surface material and/or the hydroxyl polymer filaments bridging/spanning the low-density pillow regions of the textured web material prior to wiping. When sufficient pressure is applied, such as during wiping, the surface material deforms into the pillow regions and the underlying textured surface of the textured web material becomes evident and functional to provide good cleaning and bowel movement removal. The 2-ply toilet tissue exhibits an Average Line Roughness Ra of 56.8 μm, an Average Line Roughness Rq of 59.6 μm, an Initial % Contact Area of 56%, and a Final % Contact Area of 71% as measured according to the MikroCAD Test Method described herein.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%+2% for a minimum of 24 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, fibrous structure, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 8.890 cm±0.00889 cm by 8.890 cm±0.00889 cm is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in g/m$^2$ as follows:

$$\text{Basis Weight}=(\text{Mass of stack})/[(\text{Area of 1 square in stack})\times(\text{No. of squares in stack})]$$

$$\text{Basis Weight (g/m}^2)=\text{Mass of stack (g)}/[79.032\ (\text{cm}^2)/10{,}000\ (\text{cm}^2/\text{m}^2)\times 12]$$

Report result to the nearest 0.1 g/m$^2$. Sample dimensions can be changed or varied using a similar precision cutter as mentioned above, so as at least 645 square centimeters of sample area is in the stack.

Surface Average Fiber Diameter Test Method

The Surface Average Fiber Diameter Test Method measures the average fiber diameter of filaments of a surface material and/or present on a surface of a fibrous structure.

Apparatus:

SEM Quanta 450 FEG Scanning Electron Microscope or similar

Commercial Software MIPAR Image Analysis Software version 3.3.4

Sample Preparation:

Sample Preparation for Generating SEM Image:

A 2 inch×1.5 inch sample of a fibrous structure to be tested is cut, if necessary, from a fibrous structure. The sample is placed with the surface to be measured (the surface comprising the surface material, for example hydroxyl polymer filaments, to be measured) facing up on an SEM planchet with carbon double sided tape. The planchet is placed in a Denton sputter coater (or equivalent) for Au or Au/Pd coating, approximately 2 minutes using rotation to obtain an Au or Au/Pd coated sample.

Another sample preparation can be used to obtain the data, especially with fibrous structure that comprise a high basis weight of hydroxyl polymer filaments. This sample preparation utilizes tape stripping of the surface of the fibrous structure to be measured from a 2 inch×1.5 inch sample of the fibrous structure. The tape stripped sample with the surface to be measured (the surface comprising the surface material, for example hydroxyl polymer filaments, to be measured) facing up on an SEM planchet with carbon double sided tape. The planchet is placed in a Denton sputter coater (or equivalent) for Au or Au/Pd coating, approximately 2 minutes using rotation to obtain an Au or Au/Pd coated sample. The use of this sample preparation for this Surface Average Fiber Diameter Test Method can be referred to as the Tape Stripping Surface Average Fiber Diameter Test Method.

Operation

Generation of SEM Image:

The coated sample is placed in the chamber of the SEM under high vacuum for imaging. Imaging is done at 3-5 kV accelerating voltage using the SE detector. Multiple images are obtained at 500× magnification and saved as .tif files for further analysis. If desired, the SEM measurement tool can be used to validate the scale bar at the bottom of the image. Image details in the data bar can include horizontal field width, magnification and scale bar along with additional parameters of the microscope.

A total number of ten sample images were collected and processed for each fibrous structure tested. In this case the average fiber diameter data generated represent an average of the ten images.

Method Procedure for Determining Fiber Diameter Distribution Using MIPAR from Multiple SEM Images (n=10)

1. Launch MIPAR
   Launch 'Batch Processor'
2. Load Recipe
   Drag and drop provided recipe into the recipe panel
   Open recipe by selecting 'Load Recipe'
3. Load Image
   Drag and drop images into the image panel
   Open image by selecting 'Add'
4. Set Session
   Select 'Set Save Location' to select a directory to save results to
   Edit the 'Session Name' field with a meaningful name, such as sample name and date
5. Process
   Select 'Process'
   Wait for processing to complete
6. View Results.
   Select 'View Results' this will launch the Post Processor with your session automatically loaded
7. Generate Measurements
   Select 'Measure Features' in the measurements panel
   Check 'Caliper Diameter'.Select 'View Measurement'
   Only check 'Fiber Thickness'
8. Export Measurement
   MIPAR will generate a table of all images, and all fiber diameters.
   Select 'Export' to save date as CSV to open in Excel Manual adjustments in sensitivity and corrections are performed after image processing, if necessary, for example if the image exhibits lower fiber contrast to the background and/or if there is background noise during segmentation.

The processed images are used to generate fiber diameter distribution of these samples by calculating the average fiber diameter of filaments of less than 4.0 μm from the images.

In addition, from the data generated, the amount (frequency) of fibers having fiber diameters with "buckets" of fiber diameter ranges (0.5-1.0 μm, 1.0-1.5 μm, and 1.5-2.0 μm) can be determined, which can also be shown in a histogram produced from the data.

For the present invention, in one example of the present invention, the fibrous structure may comprise a surface and/or surface material comprising filaments, for example hydroxyl polymer filaments, such as polyvinyl alcohol filaments, at a frequency of greater than 8000 and/or greater than 9000 and/or greater than 10000 and/or greater than 11000 and/or greater than 12000 and/or greater than 13000 and/or greater than 14000 and/or greater than 15000 in the 0.5-1.0 μm "bucket".

In another example of the present invention, the fibrous structure may comprise a surface and/or surface material comprising filaments, for example hydroxyl polymer filaments, such as polyvinyl alcohol filaments, at a frequency of greater than 5500 and/or greater than 6000 and/or greater than 7000 and/or greater than 8000 and/or greater than 9000 and/or greater than 10000 in the 1.0-1.5 μm "bucket".

In yet another example of the present invention, the fibrous structure may comprise a surface and/or surface material comprising filaments, for example hydroxyl polymer filaments, such as polyvinyl alcohol filaments, at a frequency of greater than 5000 and/or greater than 6000 and/or greater than 7000 and/or greater than 8000 in the 1.5-2.0 μm "bucket".

In even another example of the present invention, the fibrous structure may comprise a surface and/or surface material comprising filaments, for example hydroxyl polymer filaments, such as polyvinyl alcohol filaments, at a total frequency of greater than 18000 and/or greater than 20000 and/or greater than 25000 and/or greater than 30000 and/or greater than 32000 in the 0.5-1.0 μm+1.0-1.5 μm+1.5-2.0 μm "buckets", in other words, the sum of the frequencies from each of the 0.5-1.0 μm, 1.0-1.5 μm, and 1.5-2.0 μm "buckets".

Average Diameter Test Method

This Average Diameter Test Method is used to determine the average diameters of fibrous elements, such as filaments and/or fibers, where their known average diameters are not already known. For example, average diameters of commercially available fibers, such as rayon fibers, have known average diameters whereas average diameters of spun filaments, such as spun hydroxyl polymer filaments, would be determined as set forth immediately below. Further, pulp fibers, such as wood pulp fibers, especially commercially available wood pulp fibers would have known diameter (width) from the supplier of the wood pulp or are generally known in the industry and/or can ultimately be measured according to the Kajaani FiberLab Fiber Analyzer SubTest Method described below.

A fibrous structure comprising filaments of appropriate basis weight (approximately 5 to 20 grams/square meter) is cut into a rectangular shape sample, approximately 20 mm by 35 mm. The sample is then coated using a SEM sputter coater (EMS Inc, PA, USA) with gold so as to make the filaments relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the filaments and the background. Camera adjustments or different basis weights are used to achieve an acceptable bimodal distribution. Typically, 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69 (4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeletonized to locate the center of each fiber in the image. The distance transform of the binarized image is also computed. The scalar product of the skeletonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of filament diameters contained in the image.

Kajaani FiberLab Fiber Analyzer SubTest Method

Instrument Start-Up:

1. Turn on Kajaani FiberLab Fiber Analyzer unit first, then computer and monitor.
2. Start FiberLab program on computer.

Instrument Operation:

1. File→New (or click on New File icon)
2. "New Fiber Analysis" screen pops up.
   a. Sample Point: select the folder you would like data stored in (to add a new folder see "Adding a New Folder"
   b. Name: add condition or sample name/identifier here
   c. Date
   d. Time
   e. Sample Weight: mg of dry fiber in the 50 ml sample (can leave blank if NOT measuring for coarseness). This is the number calculated in #10 of Sample Prep below.
3. Make sure 50 ml of sample is placed in a "Kajaani beaker" and click "Start"
4. Optional: Distribution→Measured Values
   a. Fibers: the final count of measured fibers should be at least 10,000
   b. Fibers/see: this number must stay below 70 fibers/see or the sample will automatically be diluted. If the sample is diluted during an analysis, the coarseness value will be invalid and will need to be discarded.
5. A bar indicating the measurement status of a sample appears on the computer monitor. Do not start an analysis until the indicated status is "Wait State". When the analysis is completed, wait for "Wait State" to appear, then close the "New Fiber Analysis" window. You can now repeat #1¾
6. When finished with all samples, close the FiberLab program before turning off the Kajaani FiberLab analyzer unit.
7. Shutdown computer.

Sample Preparation:

Target Sample Size:

Softwood: 4 mg/50 ml→160 mg BD in 2000 ml (~170-175 mg from sheet)

Hardwood: 1 mg/50 ml→40 mg BD in 2000 ml (~40-45 mg from sheet)

1. For n=3 analysis, weigh and record weight of sample torn (avoiding cut edges) from 3 different pulp sheets of same sample using guidelines above for sample size. Place weighed samples into a suitable container for soaking of pulp.
2. Using the 3 sheets that samples were torn from, perform moisture content analysis. Note: This step can be skipped if coarseness measurement is not required.
3. Calculate the actual bone dry weight of the samples weighed in #1, by using the average moisture determined in #2.
4. Allow pulp samples to soak in water for 10-15 minutes.
5. Place 1st sample and soaking water into the Kajaani manual disintegrator. Fill disintegrator up to 250 ml mark with more water.
6. Using the "hand dasher", plunge up and down until sample is separated into individual fibers.
7. Transfer sample to a 2000 ml volumetric flask. Make sure to wash off and collect any fibers that may have adhered to the dasher.
8. Dilute up to 2000 ml mark. It is important to be as precise as possible for repeatable coarseness results.
9. Take a 50 ml aliquot and place into a Kajaani beaker. Place beaker on the sampler unit.
10. Calculate the mg of BD pulp in 50 ml aliquot
    a. (BD mg of sample/2000 ml)×50 ml
11. Begin Step #1 above in Instrument Operation The water used in this method is City of Cincinnati Water or equivalent having the following properties: Total Hardness=155 mg/L as $CaCO_3$; Calcium content=33.2 mg/L; Magnesium content=17.5 mg/L; Phosphate content=0.0462

Adding a New Folder to Sample Point Menu:

1. Settings→Common Settings→Sample Folders
   a. Type in name of new folder→Add→OK
   Note: You must close the FiberLab program and re-open program to see the new folder appear in the menu.

Collecting Data in Excel File:

1. Start FiberLab's Collect 1.12 program.
2. Open Windows Explorer (not to full screen-you must be able to see both the Explorer and the Collect windows.
3. In Windows Explorer . . . Select folder that data was stored in
4. Highlight data to be put in Excel→right click on Copy→drag highlighted samples to the Collect window→Save text
5. Click "Save In" menu bar and select "My briefcase". Open the 2007 folder, type in file name and click Save. A message will appear saying the selected samples have been saved. Click OK (the sample names will disappear from the Collect window.
6. Open Excel. Then . . . Open→Look In "My Briefcase"→2007→at bottom, select "All Files (*.*)" in the "Files of Type" bar→find text file just saved and open→click thru the Text Import Wizard screens (next, next, finish)

Caliper Test Method

Caliper of a toilet tissue and/or fibrous structure ply is measured using a ProGage Thickness Tester (Thwing-Albert Instrument Company, West Berlin, NJ) with a pressure foot diameter of 5.08 cm (area of 6.45 $cm^2$) at a pressure of 14.73 g/$cm^2$. Four (4) samples are prepared by cutting of a usable unit such that each cut sample is at least 16.13 cm per side, avoiding creases, folds, and obvious defects. An individual specimen is placed on the anvil with the specimen centered underneath the pressure foot. The foot is lowered at 0.076 cm/see to an applied pressure of 14.73 g/$cm^2$. The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils.

Dry Tensile Test Method: Elongation, Tensile Strength, TEA and Modulus

Elongation, Tensile Strength, TEA and Tangent Modulus are measured on a constant rate of extension tensile tester with computer interface (a suitable instrument is the EJA Vantage from the Thwing-Albert Instrument Co. Wet Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Twenty usable units of fibrous structures are divided into four stacks of five usable units each. The usable units in each stack are consistently oriented with respect to machine direction (MD) and cross direction (CD). Two of the stacks are designated for testing in the MD and two for CD. Using a one inch precision cutter (Thwing Albert) take a CD stack and cut two, 1.00 in ±0.01 in wide by at least 3.0 in long strips from each CD stack (long dimension in CD). Each strip is five usable unit layers thick and will be treated as a unitary specimen for testing. In like fashion cut the remaining CD stack and the two MD stacks (long dimension in MD) to give a total of 8 specimens (five layers each), four CD and four MD.

Program the tensile tester to perform an extension test, collecting force and extension data at an acquisition rate of 20 Hz as the crosshead raises at a rate of 4.00 in/min (10.16 cm/min) until the specimen breaks. The break sensitivity is set to 50%, i.e., the test is terminated when the measured force drops to 50% of the maximum peak force, after which the crosshead is returned to its original position.

Set the gage length to 2.00 inches. Zero the crosshead and load cell. Insert the specimen into the upper and lower open grips such that at least 0.5 inches of specimen length is contained each grip. Align specimen vertically within the upper and lower jaws, then close the upper grip. Verify specimen is aligned, then close lower grip. The specimen should be under enough tension to eliminate any slack, but less than 0.05 N of force measured on the load cell. Start the tensile tester and data collection. Repeat testing in like fashion for all four CD and four MD specimens.

Program the software to calculate the following from the constructed force (g) verses extension (in) curve:

Tensile Strength is the maximum peak force (g) divided by the product of the specimen width (1 in) and the number of usable units in the specimen (5), and then reported as g/in to the nearest 1 g/in.

Adjusted Gage Length is calculated to as the extension measured at 11.12 g of force (in) added to the original gage length (in).

Elongation is calculated as the extension at maximum peak force (in) divided by the Adjusted Gage Length (in) multiplied by 100 and reported as % to the nearest 0.1%.

Tensile Energy Absorption (TEA) is calculated as the area under the force curve integrated from zero extension to the extension at the maximum peak force (g*in), divided by the product of the adjusted Gage Length (in), specimen width (in), and number of usable units in the specimen (5). This is reported as g*in/$in^2$ to the nearest 1 g*in/$in^2$.

Replot the force (g) verses extension (in) curve as a force (g) verses strain curve. Strain is herein defined as the extension (in) divided by the Adjusted Gage Length (in).

Program the software to calculate the following from the constructed force (g) verses strain curve:

Tangent Modulus is calculated as the least squares linear regression using the first data point from the force (g) verses strain curve recorded after 190.5 g (38.1 g×5 layers) force and the 5 data points immediately preceding and the 5 data points immediately following it. This slope is then divided by the product of the specimen width (2.54 cm) and the number of usable units in the specimen (5), and then reported to the nearest 1 g/cm.

The Tensile Strength (g/in), Elongation (%), TEA (g*in/$in^2$) and Tangent Modulus (g/cm) are calculated for the four CD specimens and the four MD specimens. Calculate an average for each parameter separately for the CD and MD specimens.

Calculations:

Geometric Mean Tensile=Square Root of [MD Tensile Strength (g/in)×CD Tensile Strength (g/in)]

Geometric Mean Peak Elongation=Square Root of [MD Elongation (%)×CD Elongation (%)]

Geometric Mean TEA=Square Root of [MD TEA (g*in/$in^2$)×CD TEA (g*in/$in^2$)]

Geometric Mean Modulus=Square Root of [MD Modulus (g/cm)×CD Modulus (g/cm)]

Total Dry Tensile Strength (TDT)=MD Tensile Strength (g/in)+CD Tensile Strength (g/in)

Total TEA=MD TEA (g*in/$in^2$)+CD TEA (g*in/$in^2$)

Total Modulus=MD Modulus (g/cm)+CD Modulus (g/cm)

Tensile Ratio=MD Tensile Strength (g/in)/CD Tensile Strength (g/in)

Wet Tensile Test Method

Wet tensile for a toilet tissue and/or fibrous structure ply is measured according to ASTM D829-97 for "Wet Tensile Breaking Strength of Paper and Paper Products, specifically by method 11.2 "Test Method B—Finch Procedure." Wet tensile is reported in units of "g/in". Initial Total Wet Tensile is measured immediately after saturation Wet Decay Test Method Wet decay (loss of wet tensile) for a toilet tissue and/or fibrous structure ply is measured according to the Wet Tensile Test Method and is the wet tensile of the toilet tissue and/or fibrous structure ply after it has been standing in the soaked condition in the Finch Cup for 30 minutes. Wet decay is reported in units of "%". Wet decay is the % loss of Initial Total Wet Tensile after the 30 minute soaking.

Flexural Rigidity Test Method

The Flexural Rigidity Test Method determines the overhang length of the present invention based on the cantilever beam principal. The distance a strip of sample can be extended beyond a flat platform before it bends through a specific angle is measured. The inter-action between sheet weight and sheet stiffness measured as the sheet bends or drapes under its own weight through the given angle under specified test conditions is used to calculate the sample Bend Length, Flexural Rigidity, and Bending Modulus.

The method is performed by cutting rectangular strips of samples of the fibrous structure to be tested, in both the cross direction and the machine direction. The Basis Weight of the sample is determined and the Dry Caliper of the samples is measured (as detailed previously). The sample is placed on a test apparatus that is leveled so as to be perfectly horizontal (ex: with a bubble level) and the short edge of the sample is aligned with the test edge of the apparatus. The sample is gently moved over the edge of the apparatus until it falls under its own weight to a specified angle. At that point, the length of sample overhanging the edge of the instrument is measured.

The apparatus for determining the Flexural Rigidity of fibrous structures is comprised of a rectangular sample support with a micrometer and fixed angle monitor. The sample support is comprised of a horizontal plane upon which the sample rectangle can comfortably be supported without any interference at the start of the test. As it is slowly pushed over the edge of the apparatus, it will bend until it breaks the plane of the fixed angle monitor, at which point the micrometer measures the length of overhang.

Eight samples of 25.4 mm×101.5 mm-152.0 mm are cut in the machine direction (MD); eight more samples of the same size are cut in the cross direction (CD). It is important that adjacent cuts are made exactly perpendicular to each other so that each angle is exactly 90 degrees. Samples are arranged such that the same surface is facing up. Four of the MD samples are overturned and four of the CD samples are overturned and marks are made at the extreme end of each, such that four MD samples will be tested with one side facing up and the other four MD samples will be tested with the other side facing up. The same is true for the CD samples with four being tested with one side up and four with the other side facing up.

A sample is then centered in a channel on the horizontal plane of the apparatus with one short edge exactly aligned with the edge of the apparatus. The channel is slightly oversized for the sample that was cut and aligns with the orientation of the rectangular support, such that the sample does not contact the sides of the channel. A lightweight slide bar is lowered over the sample resting in the groove such that the bar can make good contact with the sample and push it forward over the edge of the apparatus. The leading edge of the slide bar is also aligned with the edge of the apparatus and completely covers the sample. The micrometer is aligned with the slide bar and measures the distance the slide bar, thus the sample, advances.

From the back edge of the slide bar, the bar and sample are pushed forward at a rate of approximately 8-13 cm per second until the leading edge of the sample strip bends down and breaks the plane of the fixed angle measurement, set to 45°. At this point, the measurement for overhang is made by reading the micrometer to the nearest 0.5 mm and is reported in units of cm.

The procedure is repeated for each of the 15 remaining samples of the fibrous structure.

Calculations:

Flexural Rigidity is calculated from the overhang length as follows:

Bend Length=Overhang length/2

Where overhang length is the average of the 16 results collected.

The calculation for Flexural Rigidity (G) is:

$$G=0.1629*W*C3(\text{mg}\cdot\text{cm})$$

Where W is the sample basis weight in pounds/3000 $ft^2$ and C is the bend length in cm. The constant 0.1629 converts units to yield Flexural Rigidity (G) in units of milligram·cm.

Bending Modulus ($Q$)=Flexural Rigidity ($G$)/Moment of Inertia ($I$) per unit area.

$$Q = G/I$$

$$Q = \frac{732*G}{\text{Caliper (mils)}^3}$$

Roll Compressibility Test Method

Figure 10:
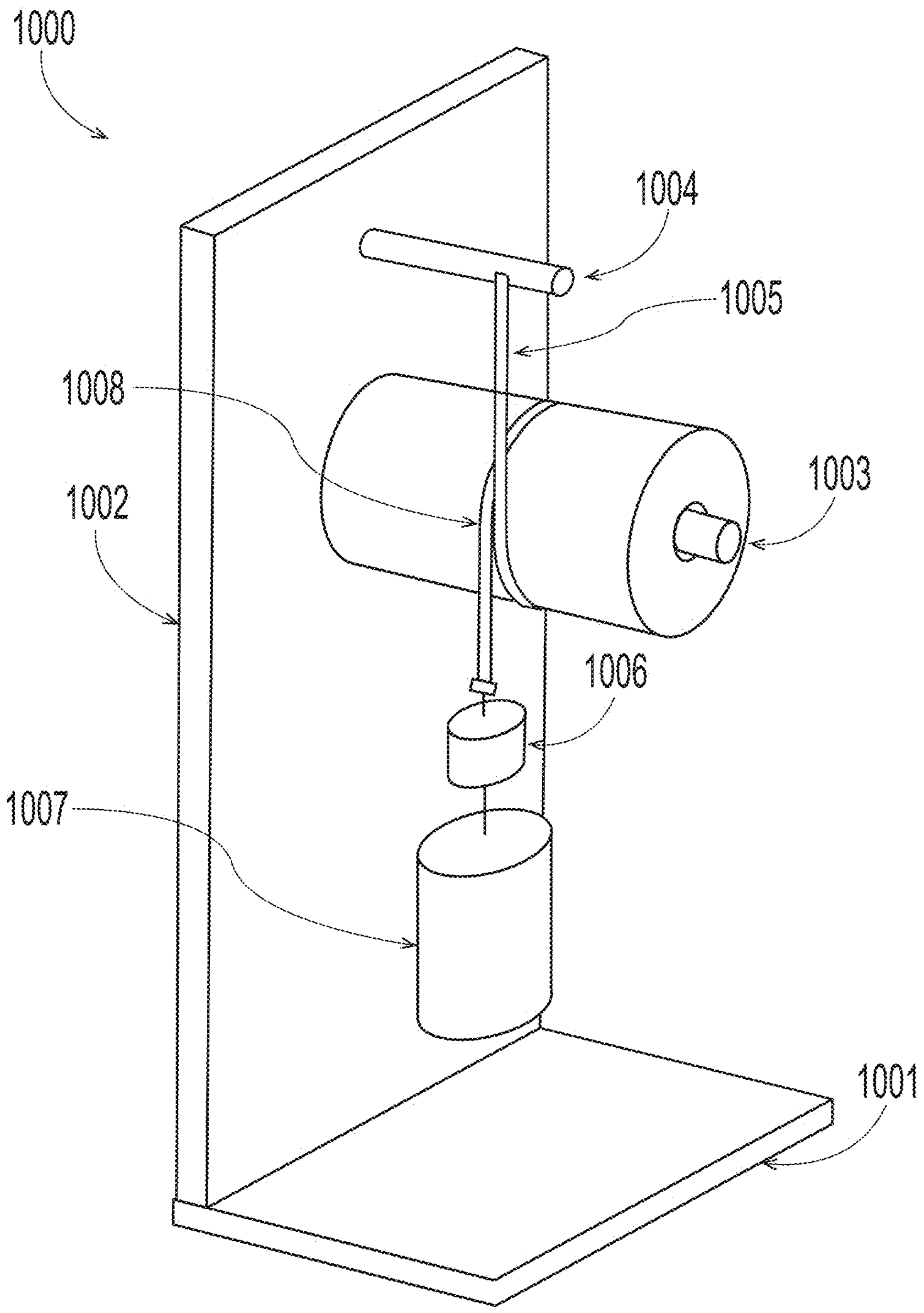
FIG. 10 is a schematic representation of the Roll Compressibility Test Method equipment and set-up.

Roll Compressibility (Percent Compressibility) is determined using the Roll Diameter Tester 1000 as shown in FIG. 10. It is comprised of a support stand made of two aluminum plates, a base plate 1001 and a vertical plate 1002 mounted perpendicular to the base, a sample shaft 1003 to mount the test roll, and a bar 1004 used to suspend a precision diameter tape 1005 that wraps around the circumference of the test roll. Two different weights 1006 and 1007 are suspended from the diameter tape to apply a confining force during the uncompressed and compressed measurement. All testing is performed in a conditioned room maintained at about 23° C.±2 C.° and about 50%±2% relative humidity.

The diameter of the test roll is measured directly using a Pi® tape or equivalent precision diameter tape (e.g. an Executive Diameter tape available from Apex Tool Group, LLC, Apex, NC, Model No. W606PD) which converts the circumferential distance into a diameter measurement so the roll diameter is directly read from the scale. The diameter tape is graduated to 0.01 inch increments with accuracy certified to 0.001 inch and traceable to NIST. The tape is 0.25 in wide and is made of flexible metal that conforms to the curvature of the test roll but is not elongated under the 1100 g loading used for this test. If necessary the diameter tape is shortened from its original length to a length that allows both of the attached weights to hang freely during the test, yet is still long enough to wrap completely around the test roll being measured. The cut end of the tape is modified to allow for hanging of a weight (e.g. a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the roll and longer than the width of the roll. A small steel bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted test roll. The height of the tape is adjusted such that the zero mark is vertically aligned with the horizontal midline of the sample shaft when a test roll is not present.

Condition the samples at about 23° C.±2 C.° and about 50%±2% relative humidity for 2 hours prior to testing. Rolls with cores that are crushed, bent or damaged should not be tested. Place the test roll on the sample shaft 1003 such that the direction the paper was rolled onto its core is the same direction the diameter tape will be wrapped around the test roll. Align the midpoint of the roll's width with the suspended diameter tape. Loosely loop the diameter tape 1004 around the circumference of the roll, placing the tape edges directly adjacent to each other with the surface of the tape lying flat against the test sample. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again read the roll diameter from the tape and record as the Compressed Roll Diameter to the nearest 0.01 inch. Calculate percent compressibility to the according to the following equation and record to the nearest 0.1%:

$$\%\text{ Compressibility} = \frac{(\text{Original Roll Diameter}) - (\text{Compressed Roll Diameter})}{\text{Original Roll Diameter}} \times 100$$

Repeat the testing on 10 replicate rolls and record the separate results to the nearest 0.1%. Average the 10 results and report as the Percent Compressibility to the nearest 0.1%.

Weight Average Molecular Weight Test Method

The weight average molecular weight and the molecular weight distribution (MWD) are determined by Gel Permeation Chromatography (GPC) using a mixed bed column. The column (Waters linear ultrahydrogel, length/ID: 300×7.8 mm) is calibrated with a narrow molecular weight distribution polysaccharide, 107,000 g/mol from Polymer Laboratories). The calibration standards are prepared by dissolving 0.024 g of polysaccharide and 6.55 g of the mobile phase in a scintillation vial at a concentration of 4 mg/ml. The solution sits undisturbed overnight. Then it is gently swirled and filtered with a 5 micron nylon syringe filter into an auto-sampler vial.

The filtered sample solution is taken up by the auto-sampler to flush out previous test materials in a 100 μL injection loop and inject the present test material into the column. The column is held at 50° C. using a Waters TCM column heater. The sample eluded from the column is measured against the mobile phase background by a differential refractive index detector (Wyatt Optilab REX interferometric refractometer) and a multi-angle later light scattering detector (Wyatt DAWN Heleos 18 angle laser light detector) held at 50° C. The mobile phase is water with 0.03M potassium phosphate, 0.2M sodium nitrate, and 0.02% sodium azide. The flowrate is set at 0.8 mL/min with a run time of 35 minutes.

MikroCAD Test Method

Percent (%) Contact Area

The % Contact Area values, for example Initial % Contact Area and Final % Contact Area, of a toilet tissue can be identified and/or measured while under no (Initial % Contact Area) or a uniform compressive pressure (Final % Contact Area) using an optical 3D surface topography measurement system (a suitable optical 3D surface topography measurement system is the MikroCAD Premium instrument commercially available from LMI Technologies Inc., Vancouver, Canada, or equivalent). The system includes the following main components: a) a Digital Light Processing (DLP) projector with direct digital controlled micro-mirrors; b) a CCD camera with at least a 1600×1200 pixel resolution; c) projection optics adapted to a measuring area of at least 60 mm×45 mm; d) recording optics adapted to a measuring area of 60 mm×45 mm; e) a table tripod based on a small hard stone plate; f) a blue LED light source; g) a measuring, control, and evaluation computer running surface texture analysis software (a suitable software is MikroCAD ODSCAD software with MountainsMap technology, or equivalent); and h) calibration plates for lateral (x-y) and vertical (z) calibration available from the vendor. The uniform compressive pressure is applied to the sample by a pressure box containing a flexible bladder beneath the sample, which is pressurized by air, and a transparent window above, through which the sample surface is visible to the camera.

The optical 3D surface topography measurement system measures the surface height of a sample using the digital micro-mirror pattern fringe projection technique. The result of the measurement is a map of surface height (z-directional or z-axis) versus displacement in the x-y plane. The system has a field of view of 60×45 mm with an x-y pixel resolution of approximately 40 microns. The height resolution is set at 0.5 micron/count, with a height range of +/−15 mm. All testing is performed in a conditioned room maintained at about 23±2° C. and about 50+2% relative humidity.

The instrument is calibrated according to manufacturer's specifications using the calibration plates for lateral (x-y axis) and vertical (z axis) available from the vendor.

Figure 11:
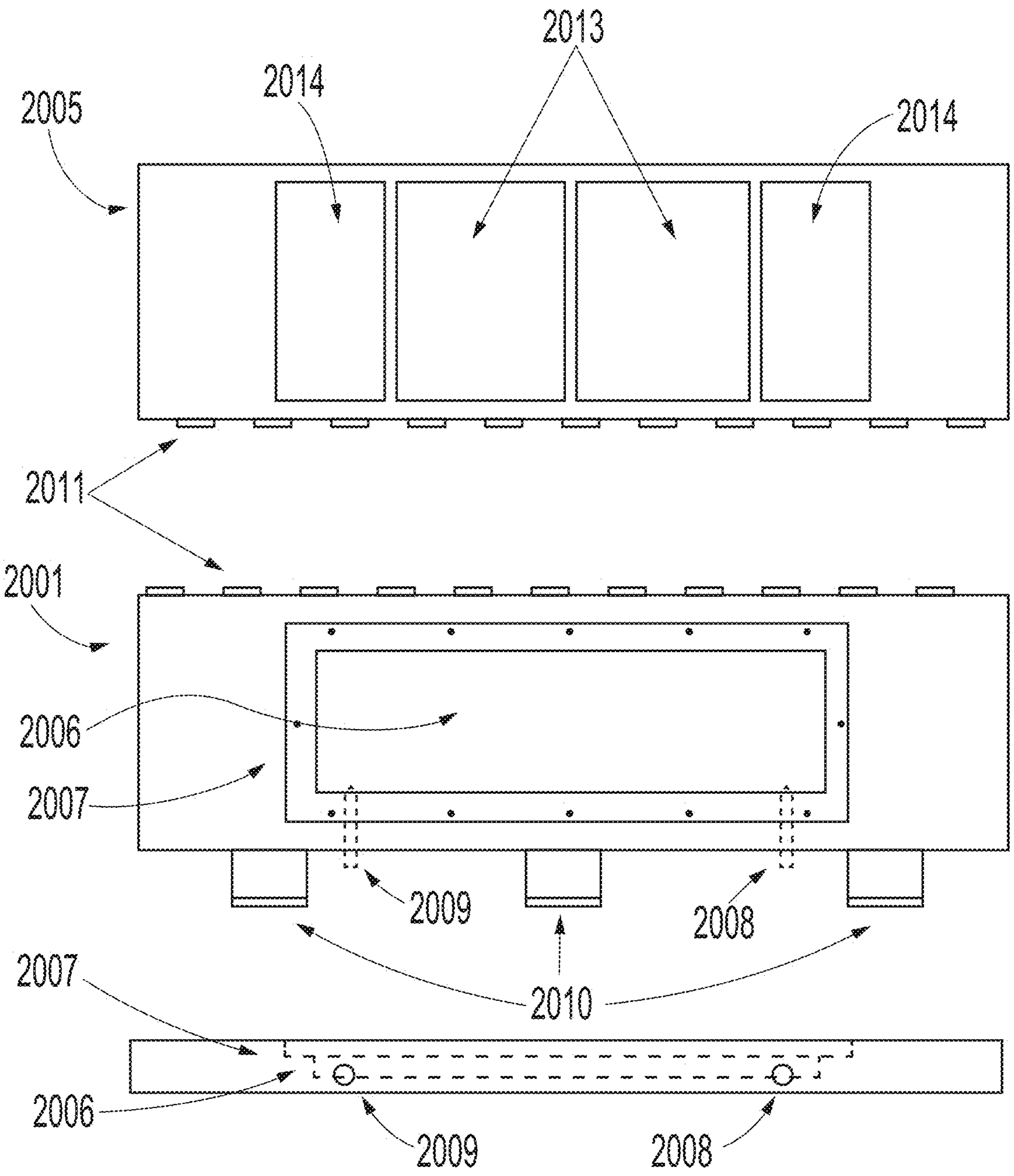
FIG. 11 is a schematic representation of a pressure box and its components used in the MikroCAD Test Method.
Figure 12:
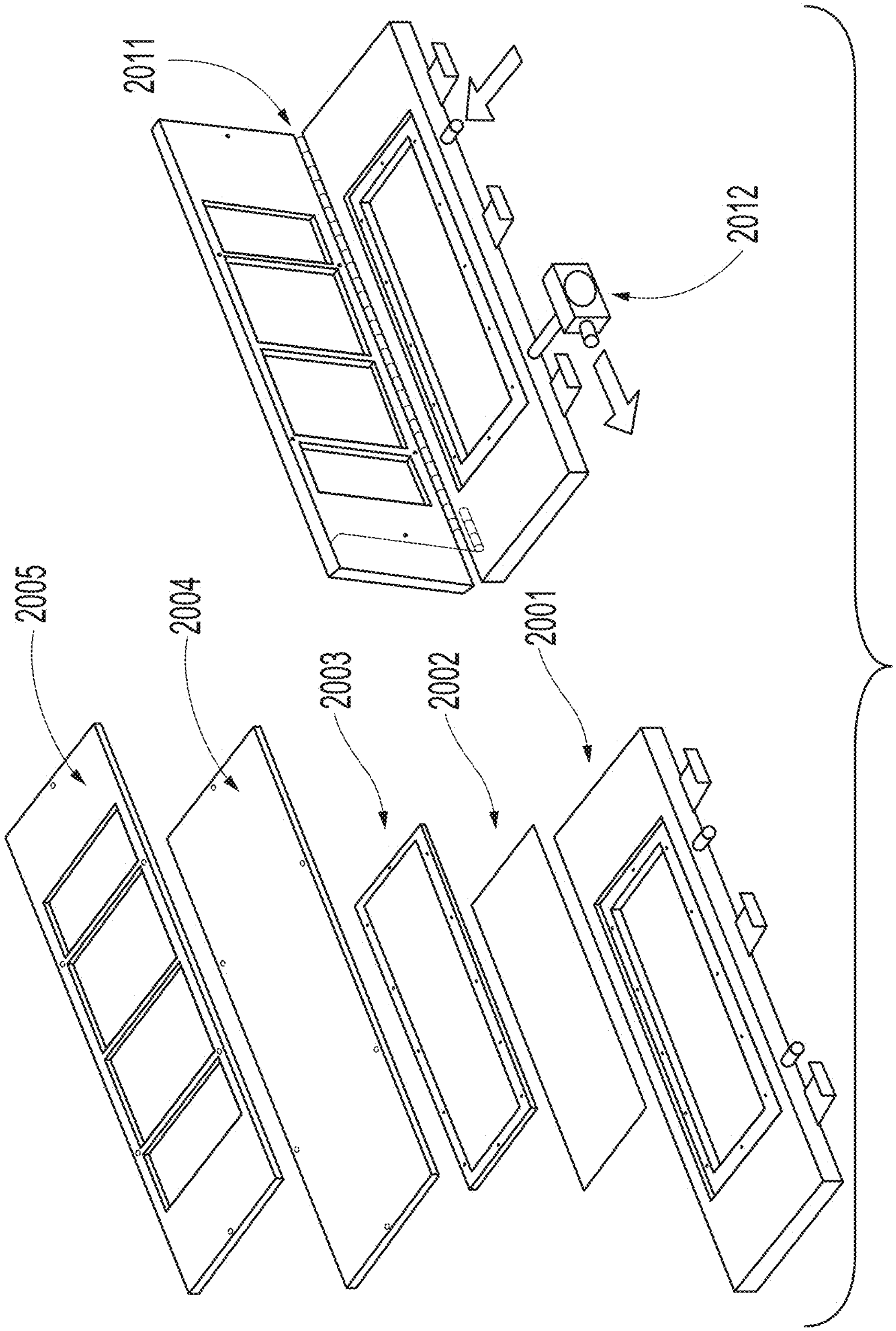
FIG. 12 is a schematic representation of a pressure box and its components used in the MikroCAD Test Method.

Referring to FIGS. 11 and 12, the pressure box consists of a Delrin base 2001 a silicone bladder 2002, an aluminum frame 2003 to attach the bladder (e.g. Bisco HT-6220, solid silicone elastomer, 0.20 in. thickness with a durometer Shore A of 20 pts; (available from Marian Chicago Inc., Chicago IL, or equivalent) to the Base 2001, an acrylic window 2004 and an aluminum lid 2005. The base 2001 is 24.0 in. long by 7.0 in. wide and 1.0 in. thick. It has a rectangular well 2006 routed into the base that is 4.0 in. wide by 14.5 in. long by 0.7 in. deep and is centered within the base. The well has a rectangular counter sink 2007 that is 0.5 in. deep and extends 0.75 in. from the edges of the well. The frame 2003 is 0.5 in. wide by 0.25 in. thick and fits within the lip of the well. The frame is used to attach the bladder 2002 to the base using 12 screws. The base has two thru holes 2008 and 2009 that are used to introduce and regulate pressurized air from underneath the bladder 2002. A back pressure regulator 2012 is used to adjust the pressure within the system. The lid 2005 is 24.0 in. long by 7.0 in. wide and 0.25 in. thick. It has four cutouts panes; the two center panes 2013 are 6.0 in. wide by 4.75 in. long and the two outbound 2014 panes are 6 in. wide by 3.0 in. long. There are three 0.25 in. bridges 2015 between the panes. The window 2004 is made of transparent acrylic that is 24.0 in. long by 7.0 in. wide and 0.125 in. thick. The window 2004 is attached to the lid 2005 using six screws. The lid and window assembly are attached to the base with a hinge 2011 along its side that aligns the two parts and secures them along the edge. When closed, the window rest flush with the top of the base. Three clamps 2010, which are attached to the base with hinges, are closed to secure the lid 2005 with the base 2001.

Test samples are prepared by cutting square samples of a toilet tissue. Test samples are cut to a length and width of about 90 mm to ensure the sample fills the camera's field of view. Test samples are selected to avoid perforations, creases or folds within the testing region. Prepare three (3) substantially similar replicate samples for testing. Equilibrate all samples at TAPPI standard temperature and relative humidity conditions (23° C.±2 C.° and 50%±2%) for at least 1 hour prior to conducting the measurement, which is also conducted under TAPPI conditions.

The toilet tissue sample is laid flat on the bladder 2002 surface and is sealed inside the pressure box so that the entire region of the sample surface to be measured is visible through a center pane 2013 in the lid 2005. The pressure box is then placed on the table with the center pane directly beneath the camera so that the sample surface fills the entire field of view.

Without delay a height image (z-direction) of the sample is collected by following the instrument manufacturer's recommended measurement procedures, which may include, focusing the measurement system and performing a brightness adjustment. No pre-filtering options should be utilized. The collected height image is saved to a computer file with ".omc" extension.

Immediately following the image collection at the no pressure (Initial % Contact Area), the pressure in the box is steadily raised to 1.7 psi (Final % Contact Area) within approximately 60 seconds, and the image collection procedure is repeated.

Analysis of a surface height image is initiated by opening the image in the analysis potion of the MikroCAD ODSCAD software. A recommended filtration process is described in ISO 11562. Accordingly, the following filtering procedure is performed on each image: 1) a Fourier Gaussian low pass filter with a cut-off wavelength of 2.5 μm; 2) an Align operation to equalize the plane; and 3) a Fourier Gaussian high pass filter with a cut-off wavelength of 25 mm. The filtered surface height image file is saved to the evaluation computer running the surface texture analysis software. This filtering procedure produces the surface from which the areal surface texture parameters will be calculated using the surface texture analysis software.

For each of the 3D surface topography images of the three replicate samples, the following analysis is performed on preprocessed sample data sets. The % Contact Area and 2-98% Height measurements are derived from the Areal Material Ratio (Abbott-Firestone) curve described in the ISO 13565-2:1996 standard extrapolated to surfaces, individually for the Initial % Contact Area image and the Final % Contact Area image. This curve is the cumulative curve of the surface height distribution histogram versus the range of surface heights measured. A material ratio is the ratio, expressed as a %, of the area corresponding to points with heights equal to or above an intersecting plane passing through the surface at a given height, or cut depth, to the cross-sectional area of the evaluation region (field of view area). The height at a material ratio of 2% is initially identified. A cut depth of 100 μm below this height is then identified, and the material ratio at this depth is recorded as the % Contact Area, either the Initial % Contact Area or the Final % Contact Area, at 100 μm. All of the % Contact Area values, both the Initial % Contact Area value and the Final % Contact Area value are recorded to the nearest 0.1%.

Line Roughness Ra and Line Roughness Rq

Line Roughness Ra and Line Roughness Rq parameters of a toilet tissue, can be identified and/or measured using an optical 3D surface topography measurement system (a suitable optical 3D surface topography measurement system is the MikroCAD Premium instrument commercially available from LMI Technologies Inc., Vancouver, Canada, or equivalent). The system includes the following main components: a) a Digital Light Processing (DLP) projector with direct digital controlled micro-mirrors; b) a CCD camera with at least a 1600×1200 pixel resolution; c) projection optics adapted to a measuring area of at least 26 mm×20 mm; d) recording optics adapted to a measuring area of 26 mm×20 mm; e) a table tripod based on a small hard stone plate; f) a blue LED light source; g) a measuring, control, and evaluation computer running ODSCAD software (version 6.2, or equivalent); and h) calibration plates for lateral (x-y) and vertical (z) calibration available from the vendor.

The optical 3D surface topography measurement system measures the surface height of a sample using the digital micro-mirror pattern fringe projection technique. The result of the measurement is a map of surface height (z-directional or z-axis) versus displacement in the x-y plane. The system has a field of view of 26×20 mm with an x-y pixel resolution of approximately 16 microns. The height resolution is set at 0.2 micron/count, with a height range of +/−3 mm. All testing is performed in a conditioned room maintained at about 23±2° C. and about 50±2% relative humidity.

The instrument is calibrated according to manufacturer's specifications using the calibration plates for lateral (x-y axis) and vertical (z axis) available from the vendor.

The Line Roughness Ra and Line Roughness Rq of different portions of a surface of a toilet tissue can be visually determined via a topography image, which is obtained for each toilet tissue sample as described below. Test samples are selected to avoid perforations, creases or folds within the testing region. Prepare at least three (3) replicate samples for testing. Equilibrate all samples at TAPPI standard temperature and relative humidity conditions (23° C.±2 C.° and 50%±2%) for at least 1 hour prior to conducting the measurement, which is also conducted under TAPPI conditions.

The toilet tissue sample of at least 5 cm by 5 cm in size is laid flat on the table directly beneath the camera so that the sample surface fills the entire field of view. A glass slide (at least 75 mm by 50 mm in size, 0.9 mm thick) is laid on the sample to ensure the sample lays flat with minimal wrinkles. A height image (z-direction) of the sample is collected by following the instrument manufacturer's recommended measurement procedures, which may include, focusing the measurement system and performing a brightness adjustment. No pre-filtering options should be utilized. The collected height image is saved to a computer file with ".omc" extension.

Analysis of a surface height image is initiated by opening the image in the analysis potion of the MikroCAD ODSCAD software. A recommended filtration process is described in ISO 11562. Accordingly, the following filtering procedure is performed on each image: 1) removal of invalid points; 2) a Fourier Gaussian low pass filter with a cut-off wavelength of 2.5 μm; 3) an Align operation to equalize the plane; and 4) a Fourier Gaussian high pass filter with a cut-off wavelength of 25 mm. This filtering procedure produces the surface from which the line roughness parameters will be calculated.

Figure 13:
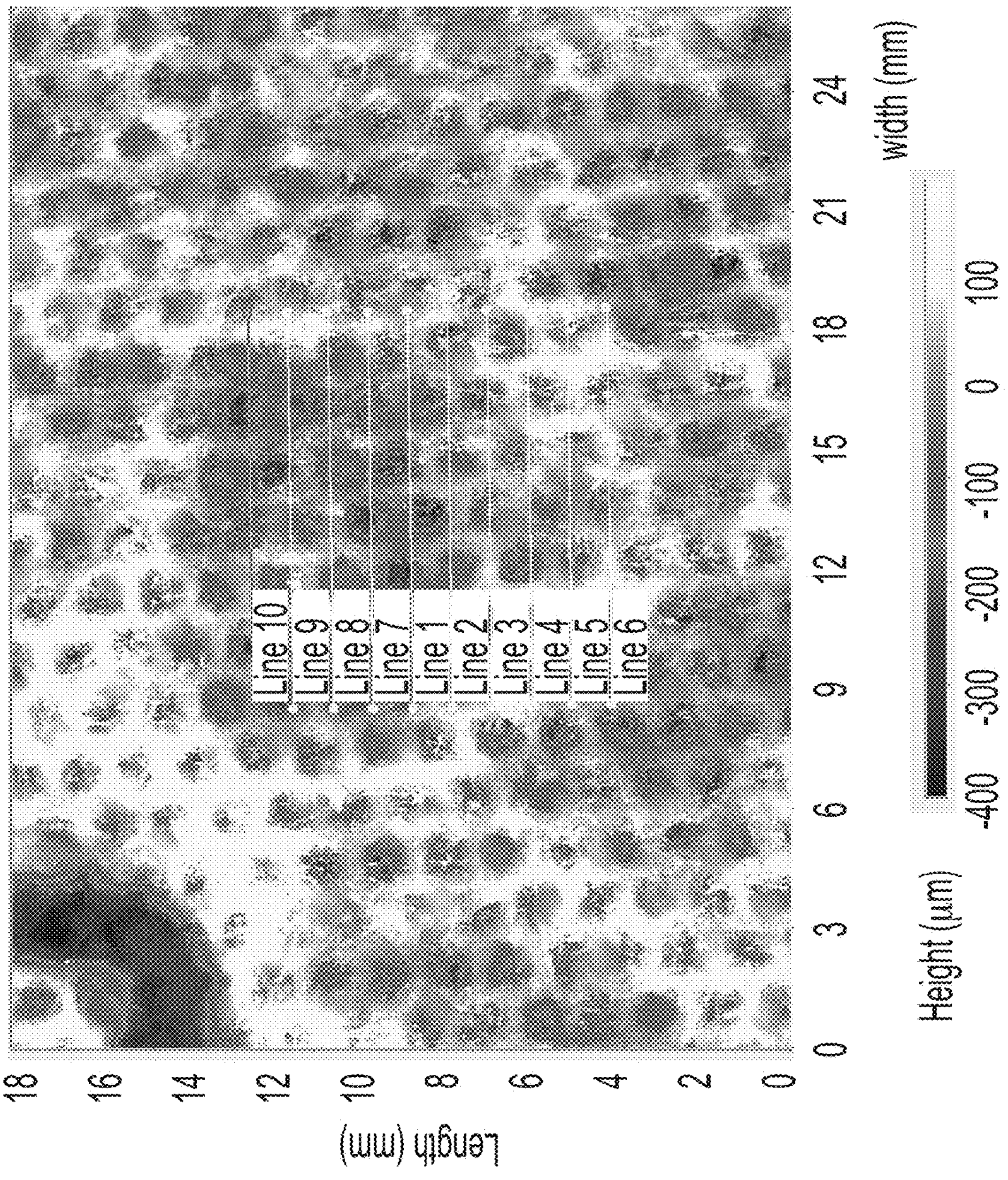
FIG. 13 is an image of a toilet tissue illustrating an example of the Line Roughness measurements according to the MikroCAD Test Method.

For each of the 3D surface topography images of the three replicate samples, the following analysis is performed on preprocessed sample data sets. The height image captured above is loaded into the analysis portion of the software. At least 10 lines at 1 mm distance apart are drawn in the machine direction of the toilet tissue using the "Draw N parallel lines" icon as shown in FIG. 13 at least 10 mm in length through the center of an unembossed or if that is not possible, then the least embossed region of features defining the texture of interest. The sectional image is displayed using the "Show Sectional Picture" icon and the line roughness parameters are calculated as described in ISO 4288 by opening the "Calculate Roughness Parameters" window. Record the Line Roughness Ra and Line Roughness Rq values to the nearest 0.1 μm. Repeat this procedure for the remaining replicate samples. Average together the replicate Line Roughness Ra values to obtain the Average Line Roughness Ra value and report to the nearest 0.1 μm. Average together the replicate Line Roughness Rq values to obtain the Average Line Roughness Rq value and report to the nearest 0.1 μm.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A toilet tissue comprising a plurality of fibrous elements, wherein the toilet tissue comprises a dynamic surface, wherein the dynamic surface comprises a surface material comprising a plurality of hydroxyl polymer filaments that overlays a through-air-dried wet-laid fibrous structure such that the toilet tissue exhibits two or more of the following properties:

a. an Average Line Roughness Ra of greater than 50 μm;

b. an Average Line Roughness Rq of greater than 57 μm;

c. an Initial % Contact Area of greater than 50%; and d. a Final % Contact Area of less than 80%;

as measured according to the MikroCAD Test Method.

2. The toilet tissue according to claim 1 wherein the plurality of fibrous elements comprises fibers.

3. The toilet tissue according to claim 2 wherein the fibers comprise pulp fibers.

4. The toilet tissue according to claim 3 wherein the pulp fibers comprise wood pulp fibers.

5. The toilet tissue according to claim 3 wherein the pulp fibers comprise non-wood pulp fibers.

6. The toilet tissue according to claim 1 wherein the through-air-dried wet-laid fibrous structure comprises a creped through-air-dried wet-laid fibrous structure.

7. The toilet tissue according to claim 1 wherein the through-air-dried wet-laid fibrous structure comprises an uncreped through-air-dried wet-laid fibrous structure.

8. The toilet tissue according to claim 1 wherein the through-air-dried wet-laid fibrous structure is an embossed through-air-dried wet-laid fibrous structure.

9. The toilet tissue according to claim 1 wherein the plurality of fibrous elements comprises filaments.

10. The toilet tissue according to claim 1 wherein the plurality of fibrous elements comprises fibers and filaments.

11. The toilet tissue according to claim 1 wherein the plurality of hydroxyl polymer filaments of the surface material exhibit an average fiber diameter of less than 2 μm as measured according to the Surface Average Fiber Diameter Test Method.

12. The toilet tissue according to claim 1 wherein the plurality of hydroxyl polymer filaments of the surface material comprise polyvinyl alcohol filaments.

13. The toilet tissue according to claim 1 wherein the plurality of hydroxyl polymer filaments of the surface material comprise polysaccharide filaments.

14. The toilet tissue according to claim 1 wherein the plurality of hydroxyl polymer filaments of the surface material are present in a first layer of polyvinyl alcohol filaments and a second layer of polysaccharide filaments.

15. The toilet tissue according to claim 1 wherein the toilet tissue is in roll form.

16. A roll of toilet tissue comprising a toilet tissue according to claim 1.

17. A package comprising one or more rolls of toilet tissue according to claim 16.

18. A method for making a toilet tissue, the method comprising the steps of:

a. providing a through-air-dried wet-laid fibrous structure comprising a plurality of fibrous elements;

b. depositing a surface material comprising a plurality of hydroxyl polymer filaments onto a surface of the through-air-dried wet-laid fibrous structure such that a dynamic surface that overlays the surface of the through-air-dried wet-laid fibrous structure is formed resulting in the toilet tissue exhibiting two or more of the following properties:

a. an Average Line Roughness Ra of greater than 50 μm;

b. an Average Line Roughness Rq of greater than 57 μm;

c. an Initial % Contact Area of greater than 50%; and d. a Final % Contact Area of less than 80%;

as measured according to the MikroCAD Test Method.

19. The method according to claim 18 wherein the method further comprises the step of perforating the toilet tissue.

20. The method according to claim 18 wherein the method further comprises the step of rolling the toilet tissue into a toilet tissue roll.

* * * * *